US009927807B1

United States Patent
Ganjoo

(10) Patent No.: US 9,927,807 B1
(45) Date of Patent: Mar. 27, 2018

(54) COMMAND AND CONTROL OF UNMANNED VEHICLES USING CELLULAR AND IP MESH TECHNOLOGIES FOR DATA CONVERGENCE

(71) Applicant: ANRA Technologies, LLC, Chantilly, VA (US)

(72) Inventor: Amit Ganjoo, Stone Ridge, VA (US)

(73) Assignee: ANRA Technologies, LLC, Chantilly, VA (US)

( * ) Notice: Subject to any disclaimer, the term of this patent is extended or adjusted under 35 U.S.C. 154(b) by 0 days.

(21) Appl. No.: 15/200,493

(22) Filed: Jul. 1, 2016

Related U.S. Application Data

(60) Provisional application No. 62/191,820, filed on Jul. 13, 2015.

(51) Int. Cl.
 *G05D 1/00* (2006.01)
 *H04B 7/185* (2006.01)
 (Continued)

(52) U.S. Cl.
 CPC ......... *G05D 1/0022* (2013.01); *B64C 39/024* (2013.01); *G08G 5/003* (2013.01);
 (Continued)

(58) Field of Classification Search
 CPC .. G05D 1/0022; G08G 5/0091; G08G 5/0004; G08G 5/006; H04B 7/18506;
 (Continued)

(56) References Cited

U.S. PATENT DOCUMENTS 8,909,391 B1 12/2014 Peeters et al.
8,989,922 B2 3/2015 Jones et al.
(Continued)

FOREIGN PATENT DOCUMENTS

WO WO-2015179439 A1 * 11/2015 ............ H04W 24/10

OTHER PUBLICATIONS

'Altitude Angel' [online]. 2016, [retrieved on Jun. 23, 2016]. Retrieved from the Internet: <URL: https://www.altitudeangel.com/>, 5 pages.
(Continued)

*Primary Examiner* — Tyler J Lee
(74) *Attorney, Agent, or Firm* — Fish & Richardson P.C.

(57) ABSTRACT

Methods, systems, and apparatus, including computer programs encoded on computer storage media, for control of unmanned vehicles. One of the methods includes determining, using an internet protocol mesh module, whether a peer unmanned vehicle is within a predetermined physical distance from the unmanned vehicle to enable creation of a mesh network for network communications between an unmanned vehicle and the peer unmanned vehicle, determining, using a cellular gateway module, whether the unmanned vehicle can connect to a cellular network, determining, using the available networks, a communications path between the unmanned vehicle and a control system, creating, using the communications path between the unmanned vehicle and the control system, a network connection with the control system, receiving, from the control system via the network connection, navigation commands, and using the navigation commands to control movement of the unmanned vehicle.

28 Claims, 14 Drawing Sheets

(51) Int. Cl.
| | |
|---|---|
| H04W 76/02 | (2009.01) |
| B64C 39/02 | (2006.01) |
| G08G 5/00 | (2006.01) |
| H04L 29/06 | (2006.01) |
| H04W 84/04 | (2009.01) |
| H04W 84/18 | (2009.01) |

(52) U.S. Cl.
CPC ........... *G08G 5/0004* (2013.01); *G08G 5/006* (2013.01); *G08G 5/0091* (2013.01); *H04B 7/18506* (2013.01); *H04L 63/0428* (2013.01); *H04W 76/02* (2013.01); *B64C 2201/122* (2013.01); *B64C 2201/146* (2013.01); *H04W 84/042* (2013.01); *H04W 84/18* (2013.01)

(58) Field of Classification Search
CPC ... H04W 76/02; H04W 84/042; H04W 84/18; H04L 63/0428; B64C 39/024; B64C 2201/122; B64C 2201/146
USPC ............................................................ 701/2
See application file for complete search history.

(56) References Cited

U.S. PATENT DOCUMENTS

| | | | |
|---|---|---|---|
| 9,313,667 B1* | 4/2016 | Daoura .............. | H04B 7/18504 |
| 2007/0284474 A1* | 12/2007 | Olson .................. | G05D 1/0022 244/10 |
| 2007/0299947 A1* | 12/2007 | El-Damhougy .... | H04W 76/028 709/223 |
| 2012/0182867 A1* | 7/2012 | Farrag ............... | H04W 28/0236 370/230 |
| 2012/0237028 A1* | 9/2012 | Khazan ................ | G05D 1/0022 380/201 |
| 2013/0289858 A1 | 10/2013 | Mangiat et al. | |
| 2014/0254896 A1 | 9/2014 | Zhou et al. | |
| 2015/0120094 A1* | 4/2015 | Kimchi ................ | B64C 39/024 701/3 |

OTHER PUBLICATIONS

'Skyward' [online]. 2016, [retrieved on Jun. 23, 2016]. Retrieved from the Internet: <URL: https://skyward.io/>, 8 pages.

'iTunes Preview' [online]. "AirMap for Drones," 2016, [retrieved on Jun. 23, 2016]. Retrieved from the Internet: <URL: https://itunes.apple.com/us/app/airmap-for-drones/id10428247337?Is=1&mt=8>, 5 pages.

'Wikipedia' [online]. "Dijkstra's algorithm," Jul. 13, 2015, [retrieved on Jun. 23, 2016]. Retrieve form the Internet: <URL: https://en.wikipedia.org/wiki/Dijkstra_algorithm>, 12 pages.

* cited by examiner

COMMAND AND CONTROL OF UNMANNED VEHICLES USING CELLULAR AND IP MESH TECHNOLOGIES FOR DATA CONVERGENCE

CROSS-REFERENCE TO RELATED APPLICATION

This application claims the benefit of U.S. Provisional Application No. 62/191,820, filed Jul. 13, 2015, the contents of which are incorporated by reference herein.

BACKGROUND

Drones, such as unmanned aerial vehicles have been used by the military for various purposes. Proposed domestic uses for drones may include law enforcement and other government functions.

SUMMARY

Various exemplary embodiments relate to a Cellular and IP Mesh modules. The module may include: a system capable of integrating into an onboard auto pilot/navigation unit; and a wireless network transceiver/receiver configured to transmit the location of the drone; other telemetry information and on board sensor data such as video camera to a central control station. Various exemplary embodiments relate to a method performed by the modules. The method may include: receiving command and control information; navigating the drone along the navigation path based on satellite location signals; determining current position information based on the satellite location signals; and transmitting the current position and sensor information real-time via a on board cellular and mesh modules control station.

The modules implement an architecture that eliminates range limitation of the drone and offers high bandwidth solution that can be used for command/control and sensor data dissemination. The system may enable one or multiple drones to fly as long as contiguous Cellular coverage is available. In addition for places where cellular coverage is not available the systems and methods described below may allow drones to create a self-contained Ad-hoc IP Mesh network to allow autonomous operations. All the drones in use can be managed from a local or cloud based IP enabled control station or a laptop/tablet.

The modules allows cellular and Mesh components to seamlessly integrate with each other and adapt based on the need of the mission giving the operators a level of flexibility that does not exist today. The command/control of the Drones can be centralized or delegated to any other user in the established network over IP.

The systems and methods described in this document may allow an operator to control a drone in location A while a video feed or other sensor data for the drone can be viewed securely by others in locations B, C and D.

It features granular control of user access and privileges for operators and end users: create Ad-hoc IP mesh networks using multiple drones as mesh nodes and leverage commercial cellular networks where available to further extend range; control multiple drones from a centralized location; converge command and control, video and telemetry over a single encrypted link; and sensor data can be disseminated to users across the globe over the internet securely.

In some implementations, a system leverages commercially available technology and enables drones with solutions that offer low cost and higher capability or services compared to previous solutions.

In light of the above there is a need for an IP Mesh and a Cellular Gateway Module, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments related to the module. The drone may include: Cellular Gateway Module, IP mesh Module, Crypto Module, Navigation Gateway, Sensor Payload Gateway and a Processor module.

A combination of these modules enables transmission and reception of sensor data, telemetry, and command and control information to a central control system.

In various embodiments, the Cellular and Mesh modules can be further configured to receive navigational data information.

Cellular and Mesh module may seamlessly integrate with each other and adapt based on the need of the mission giving the operators a level of flexibility that does not exist today. The command/control of the Drones can be centralized or delegated to any other user in the established network over IP.

In various embodiments, the Cellular and Mesh Modules includes a weatherized electronics casing surrounding all the internal components.

In various embodiments, the drone further includes a processor module configured to correlate the sensor information (e.g., video, electro optical/infra-red) with the location of the drone before transmitting the information to the central control station.

In various embodiments, the drone further includes a plurality of rotors.

In various embodiments, the method further includes: determining the available bandwidth for each of the hops as well as the bandwidth available via all available gateways to either local or remote cloud based control station; and selecting the best available gateway and packet routing path based on minimum latency, packet loss and available throughput over the link.

Various exemplary embodiments relate to a network system. The network system may include: a cellular gateway module with access to a commercial or a private cellular network to enable sharing of the telemetry, sensor, command and control data with cloud based control system and disseminate the same data to sensor data consumers on their handheld tablets and cell phones.

In various embodiments, the central control station is configured to correlate the drone location information and with other drones and optimize the integral mesh modules in various drones.

In various embodiments, the central control station can be cloud hosted or a local instance running at any one of the ground based locations In various embodiments, the drone is an unmanned aerial vehicle including a plurality of rotors.

Various exemplary embodiments relate to a method of providing wireless connectivity. The method may include: providing an unmanned aerial vehicle (drone) having an integrated wireless access point, the wireless access point configured to connect to a Mesh network; and forwarding wireless communications (voice, video, data) from the drone to devices operated by corresponding other users in the mesh network via other access points or WAN link via the local control station on the ground.

In general, one innovative aspect of the subject matter described in this specification can be embodied in methods that include the actions of determining, using an internet protocol mesh module, whether a peer unmanned vehicle is within a predetermined physical distance from the unmanned vehicle to enable creation of a mesh network for network communications between an unmanned vehicle and the peer unmanned vehicle, determining, using a cellular gateway module, whether the unmanned vehicle can connect to a cellular network, determining, using the available networks, a communications path between the unmanned vehicle and a control system, creating, using the communications path between the unmanned vehicle and the control system, a network connection with the control system, receiving, from the control system via the network connection, navigation commands, and using the navigation commands to control movement of the unmanned vehicle. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving, by one or more computers, current location data for an unmanned vehicle, receiving, by at least one of the computers, data from an external source, determining, by at least one of the computers, a mission path for the unmanned vehicle, generating, by at least one of the computers, navigation instructions for the unmanned vehicle using the current location, the data from the external source, and the mission path, and providing, by at least one of the computers, the navigation instructions to the unmanned vehicle to change a current path of the unmanned vehicle. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. A method may be performed by an unmanned vehicle. The unmanned vehicle may include a cellular gateway module, an internet protocol mesh module, or both. The unmanned vehicle may include one or more sensors. The method may include capturing, from each of the one or more sensors, sensor data, and providing, to the control system via the network connection, the sensor data for analysis by another device. Providing the sensor data for analysis by another device may include providing the sensor data for analysis by an operator device separate from the control system. Providing the sensor data for analysis by another device may include providing the sensor data for analysis by the control system. The method may include determining, using the available networks, that a communications path between the unmanned vehicle and the control system is not available, determining, using the available networks, that a second communications path between the unmanned vehicle and a local control station is available, creating, using the second communications path, a second network connection with the local control station, receiving, from the local control station via the second network connection, second navigation commands, and using the second navigation commands to control movement of the unmanned vehicle. Creating the network connection with the control system may include creating an encrypted network connection with the control system for use during all network communications with the control system. Receiving, from the control system via the network connection, the navigation commands may include receiving, from the control system via the encrypted network connection, encrypted data that includes the navigation commands, the operations comprising decrypting the encrypted data to determine the navigation commands.

In some implementations, receiving the data from the external source may include receiving data that identifies one or more hazards, one or more obstacles, one or more airspace restrictions, or one or more notices to airmen. Receiving the data from the external source may include receiving data that identifies current positions and trajectories for one or more other vehicles. Receiving the data from the external source may include receiving data that identifies traffic management data. Receiving the data from the external source may include receiving data that identifies current weather conditions. Receiving the data from the external source may include receiving data that identifies predicted weather conditions. Receiving the data from the external source may include receiving data that identifies a likelihood of risk to the unmanned vehicle. Receiving the data that identifies a likelihood of risk to the unmanned vehicle may include receiving the data that identifies a likelihood of risk to the unmanned vehicle based on a proximity of the unmanned vehicle to another vehicle. Receiving the data that identifies a likelihood of risk to the unmanned vehicle may include receiving the data that identifies a likelihood of risk to the unmanned vehicle based on a condition of an operational area for the mission path of the unmanned vehicle.

In some implementations, the method may include receiving, by at least one of the computers, sensor data for the unmanned vehicle, and providing, by at least one of the computers, the sensor data to an operator device for presentation. The method may include receiving, by at least one of the computers from an operator device, a navigation command for the unmanned vehicle, and providing, by at least one of the computers, data indicating the navigation command to the unmanned vehicle to cause the unmanned vehicle to change a current path of the unmanned vehicle. The method may include determining an access level for the operator device, and determining whether the access level for the operator device allows the operator device to control the unmanned vehicle. Providing, by at least one of the computers, data indicating the navigation command to the unmanned vehicle to cause the unmanned vehicle to change a current path of the unmanned vehicle may be responsive to determining that the access level for the operator device allows the operator device to control the unmanned vehicle. Determining the access level for the operator device may include determining a current access level for the operator device with respect to the unmanned vehicle and not a different unmanned vehicle.

The subject matter described in this specification can be implemented in particular embodiments and may result in one or more of the following advantages. In some implementations, a control system may implement multiple access levels for mission control of a vehicle with multiple operators to eliminate the potential of confusion, accidental mission changes, accidental mission conflicts, or a combination of two or more of these. In some implementations, a control system that receives data from multiple sources may automatically and in real time update a path of a vehicle to ensure a best known optimal path for the vehicle, to reduce the likelihood of the vehicle colliding with another object, or both. The use of the best known optimal path may reduce path travel time, reduce resources used by the vehicle to travel along the path, or both. In some implementations, a control system may provide flight path planning, flight path monitoring, traffic separation and collision avoidance capabilities, or a combination of two or more of these.

Various exemplary embodiments enable mesh and cellular drone modules. In particular, by equipping a drone with mesh and cellular modules, the mobility and versatility of drones may be used for commercial business purposes.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
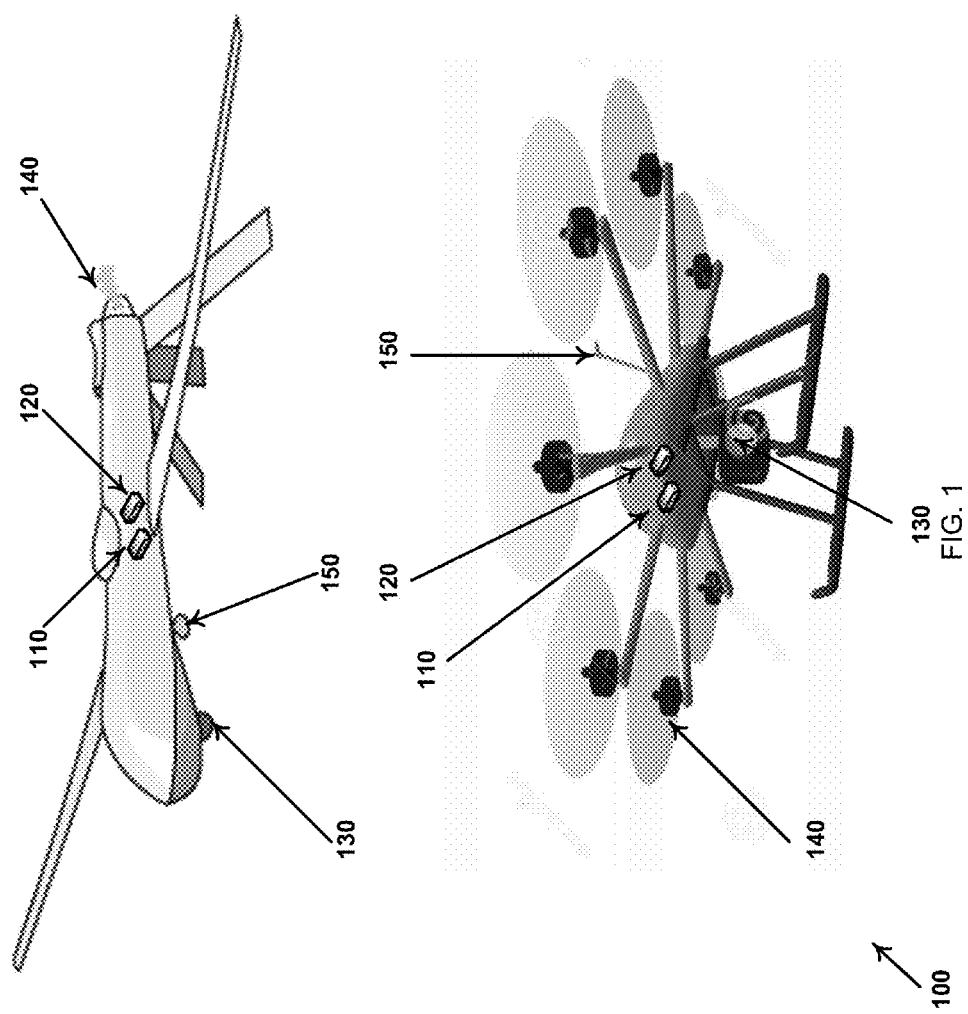
FIG. 1 illustrates an exemplary unmanned aerial vehicle.

A system combines sensor data, telemetry and command/control over a single cellular link or an ad hoc Mesh network as described in more detail below. This allows the information to be distributed to nearly any kind of device and to multiple locations simultaneously. For example someone in the field could get a live video stream from a drone right along with someone one thousand miles away on a tablet, e.g., both people would view the same live video stream using different devices physically located at different locations. On the back side the system creates ad hoc mesh networks which effectively extends range and give the ability to control multiple drones from a single device.

The system may include a cellular component that involves integrating a cellular chip set on board the drone allowing communication with the commercial or private cellular network. In addition, there are software components written specifically to allow integrating into onboard drone systems—such as autopilot, onboard sensor, video sensors etc. The cellular components of the architecture may establish a link to the commercial or a private cellular operator depending on the area of operation.

The data is then tunneled through a commercial network to a ground based control station and/or multiple end user locations that need access to the real time sensor data from the drone. All the data may be encrypted using AES 256 and/or Suite B encryption.

The second component involves an IP mesh network, which comes into play in areas where there is no or limited cellular coverage. Two or more of the DRONES can establish an Ad-hoc mesh network in the air and communicate, using an appropriate gateway, with a cloud based or local control station over the mesh net as well. At any point if a commercial cellular network becomes available the drone allows real time connection to a wider IP wide area network (WAN) and disseminates the command/control and sensor data. A system may allow the user to control/command multiple drones from a centralized location or multiple disjointed locations as long as there is an IP path over a WAN to get there.

The operators can change the drone mission in real time by changing, adding and removing way points, and issuing commands to the drone etc. In addition they can access the sensor data from the drone at any location using any supported device.

The system may intelligently prioritize the use of available transport network bandwidth between the cellular and mesh technology using heuristic routing.

Heuristic routing is a system used to describe how data is delivered when problems in a network topology arise. Heuristic routing is achieved using specific algorithms to determine the best, although not always optimal, path to a destination. When an interruption in a network topology occurs, the software running on the networking electronics calculates another route to the desired destination via an alternate available path.

In some implementations, a system may use Link State Algorithms for heuristic routing. Link State routing protocols build a topographical map of the entire network based on updates from neighbor routers, and then use the Dijkstra algorithm to compute the shortest path to each destination. Metrics used are based on the number of hops, delay, throughput, traffic, and reliability.

Referring now to the drawings, in which like numerals refer to like components or steps, there are disclosed broad aspects of various exemplary embodiments.

As used herein the term "drone" may refer to any vehicle without an on-board human pilot. For example, drones may include, but are not limited to, unmanned aerial vehicles, fixed-wing unmanned aerial vehicles, rovers, walking robots, hovercraft, submersibles, and surface vehicles. These drones may utilize various modes of propulsion and/or flight.

FIG. 1 illustrates an exemplary unmanned aerial vehicle (drone) 100. Drone 100 may be a commercially available drone platform that has been modified to carry specific electronic components as described in further detail below. Drone 100 may include cellular module case 110, mesh module case 120, sensor 130, rotors 140 and antennas 150. Rotors 140 may provide lift for the drone 100. In some examples, the drone 100 may include eight rotors or be a fixed wing platform using multiple propellers. The number and size of the rotors/propellers may vary based on particular lift and flight time needs. Module case 110/120 may be any container for housing electronics components. In various embodiments, cellular and mesh module case 110/120 is a weatherized, light-weight, plastic pod. Electronics components within module case 110/120 may be secured to the electronics case and grounded. Electronics components may be surrounded with fireproof foam or mounted on rubberized brackets to reduce vibration. Modules case 110/120 may include heat sinks, fans, or vents to dissipate heat generated by electronics components. Drone 100 may provide a mounting point for attaching components outside of module case 110/120.

Figure 2:
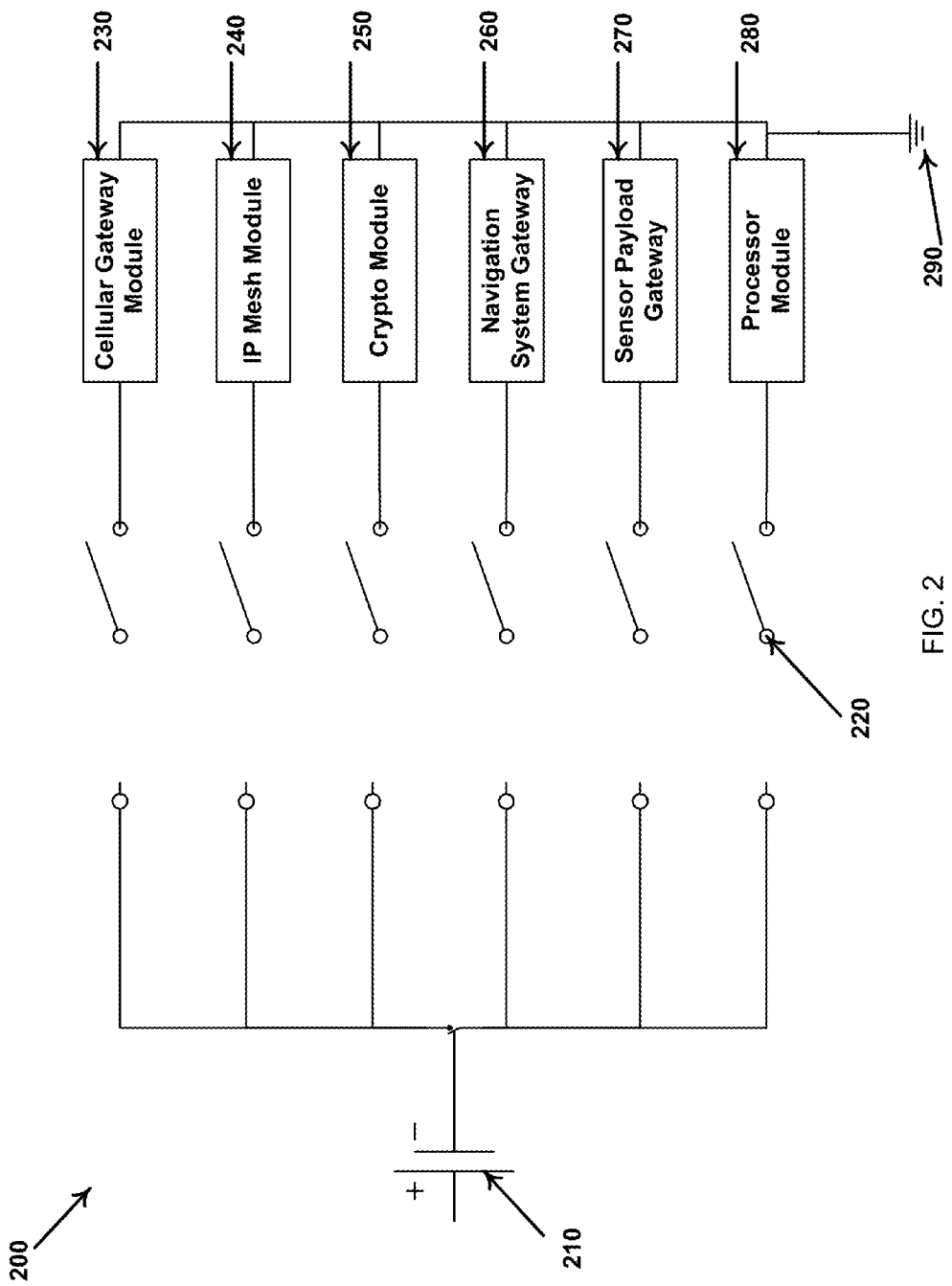
FIG. 2 illustrates a schematic diagram of electronic components supporting Cellular and Mesh technologies.

FIG. 2 illustrates a schematic diagram of electronic components of a drone 200. Drone 200 may be built on drone platform 100. Drone 200 may include a battery 210, switch 220, cellular gateway module 230, mesh module 240, crypto module 250, navigation system gateway 260, sensor payload module 270, and processor module 280. The electronic components of drone 200 may be connected to ground 290. In other embodiments, sensor payload module 270 may be replaced or used in conjunction with other detection and sensing devices, which may include, radar, sonar, chemical sensors. In some embodiments, this drone may include an avoidance or anti-collision system.

Battery 210 may store energy for powering drone 200. In various embodiments, battery 205 is a lithium-ion battery. The battery power source may be augmented or replaced by a fuel cell, solar unit, laser powering system, or other remote charging methodology. In some embodiments, the battery may be charged using inductive charging methods. Any battery providing sufficient power for drone 200 may be used. It should be appreciated that a battery with a high energy to weight ratio may improve flight time of drone 200.

Switch 220 may be a switch such as a single throw multiple post switch for simultaneously switching power to each of the various components of the drone 200 (e.g., mesh and cellular modules etc.).

Cellular Gateway module 230 may include a commercial 3GPP compliant technology such as 2G, 3G, 4G, LTE, or 5G. Any wireless technology may be used. Power consumption of Cellular gateway module 230 may be considered in selecting a specific device and protocol. For example, the Cellular Gateway module 230 may require 12 to 48 volts. Cellular Gateway 220 may be capable of high speed hand-offs using, standard cellular roaming. Accordingly, cellular gateway module 230 may be in communication with cellular providers during flight of drone 100. Cellular gateway module 230 may use encryption protocols AES 256, IPSEC, TLS, or SSL to secure wireless communications. RF Filters may be used to limit wireless traffic to prevent interference.

IP Mesh module 240 may be an industrial IEEE 802.11 or 802.16 wireless devices. Any wireless protocol may be used. Power consumption of IP Mesh module 240 may be considered in selecting a specific device and protocol. For example, wireless client 240 may require 12 to 48 volts DC. In various embodiments, IEEE 802.11a, b, g, n, ac or 802.16f, e, m protocols may be used or any other wireless communication protocol. Accordingly, IP Mesh module 240 may be in communication with multiple wireless access points during flight of drone 100. IP Mesh module 240 may use security protocols such as WEP, WPA, WPA2, and 802.11x, IPSEC, TLS, SSL to secure wireless communications. RF Filters may be used to limit wireless traffic to prevent interference.

Crypto Module 250 may be NIST certified FIPS 140-2 Level 2 software modules/libraries that ensures secure communication. Crypto module may interface with Cellular Gateway Module 230, and IP Mesh module 240, Navigation System Gateway 260, Sensor Payload Gateway 270. Crypto module 250 may receive data from one component and format the data for use by another component. Crypto module 250. In various embodiments, processor 250 may be integral with another electronic component, such as, for example, Cellular gateway module 230 or IP Mesh Module 240.

Navigation System Gateway 260 may be a module for receiving telemetry output including location information from an autopilot on board the drone over a serial or IP interface. Navigation System Gateway may include its own global positioning system (GPS) receiver for receiving GPS location signals and determining a location. In various embodiments, Navigation System Gateway 260 may be integrated with a compass module and a drone navigation system.

Navigation System Gateway 260 may receive navigation path information provided via Cellular Gateway Module 230 or IP Mesh Module 240. Navigation System Gateway 260 may operate between 4.0-6.0 volts. In various alternative embodiments, Navigation System Gateway 260 may provide information to a human pilot who remotely controls drone 200 via Cellular Gateway Module 230 or IP Mesh Module 240.

Processor 280 may control operation of various computer programs on drone 100. Processor 280 may be connected to Cellular Gateway Module 230, and IP Mesh module 240, Navigation System Gateway 260, Sensor Payload Gateway 270. Processor 280 may receive data from one component and format the data for use by another component. Processor 280. In various embodiments, processor 280 may be integral with another electronic component, such as, for example, Cellular Gateway Module 230 or IP Mesh Module 240.

Figure 3:
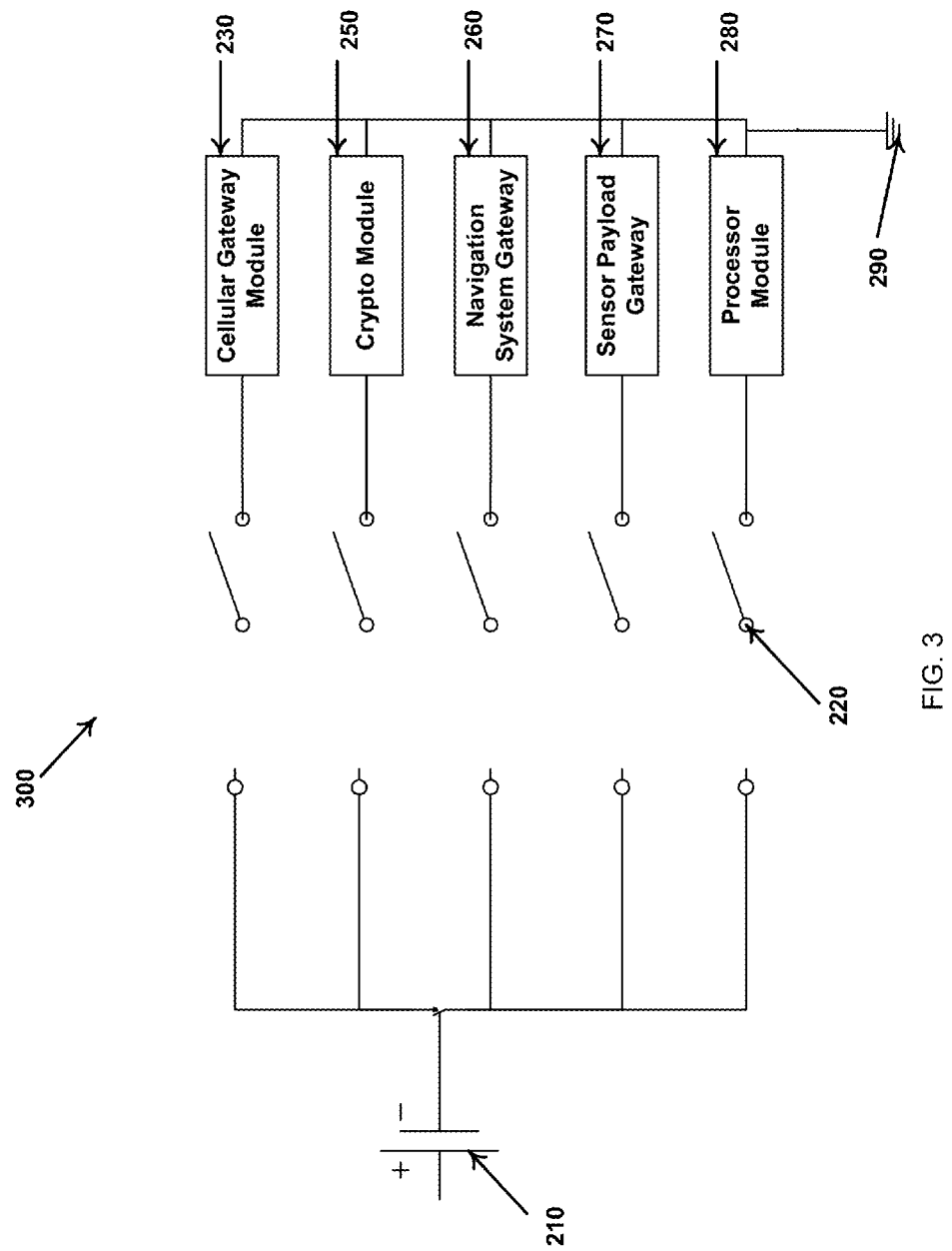
FIG. 3 illustrates a schematic diagram of electronic components supporting cellular technologies.

FIG. 3 illustrates another schematic diagram of electronic components of an embodiment of a drone 300. Drone 300 may be built on drone platform 100. Accordingly, drone 200 may include some of the same components as drone 200 with the exception of module 240. Drone 300 may include a battery 210, switch 220, and Cellular gateway module 230, crypto module 250, navigation system gateway 260, sensor payload module 270, and processor module 280. The electronic components of drone 300 may be connected to ground 290.

Figure 4:
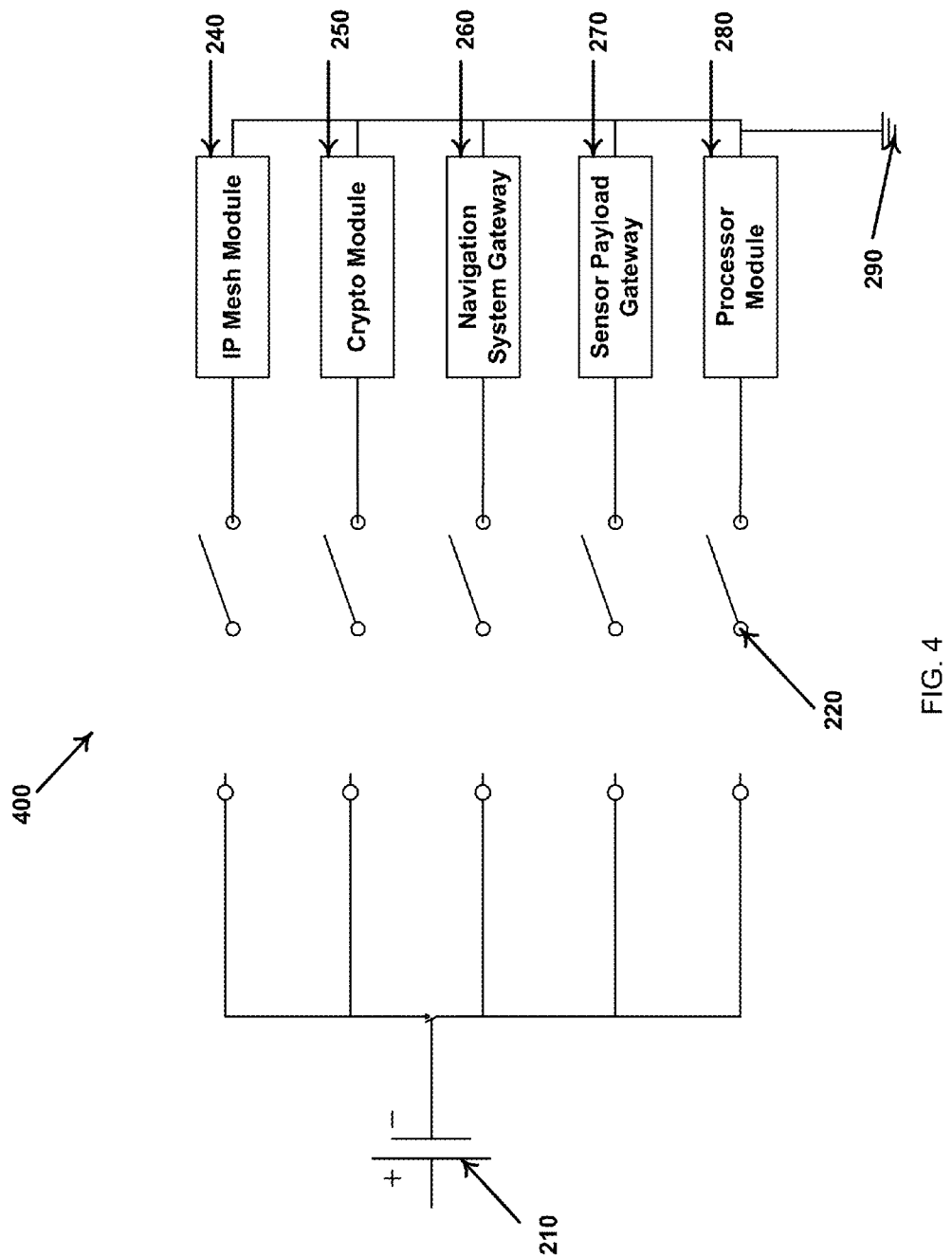
FIG. 4 illustrates a schematic diagram of electronic components support mesh technologies.

FIG. 4 illustrates another schematic diagram of electronic components of an embodiment of a drone 400. Drone 400 may be built on drone platform 100. Accordingly, drone 400 may include some of the same components as drone 200 with the exception of module 230. Drone 400 may include a battery 210, switch 220, IP Mesh Module 240, crypto module 250, navigation system gateway 260, sensor payload module 270, and processor module 280. The electronic components of drone 400 may be connected to ground 290.

Figure 5:
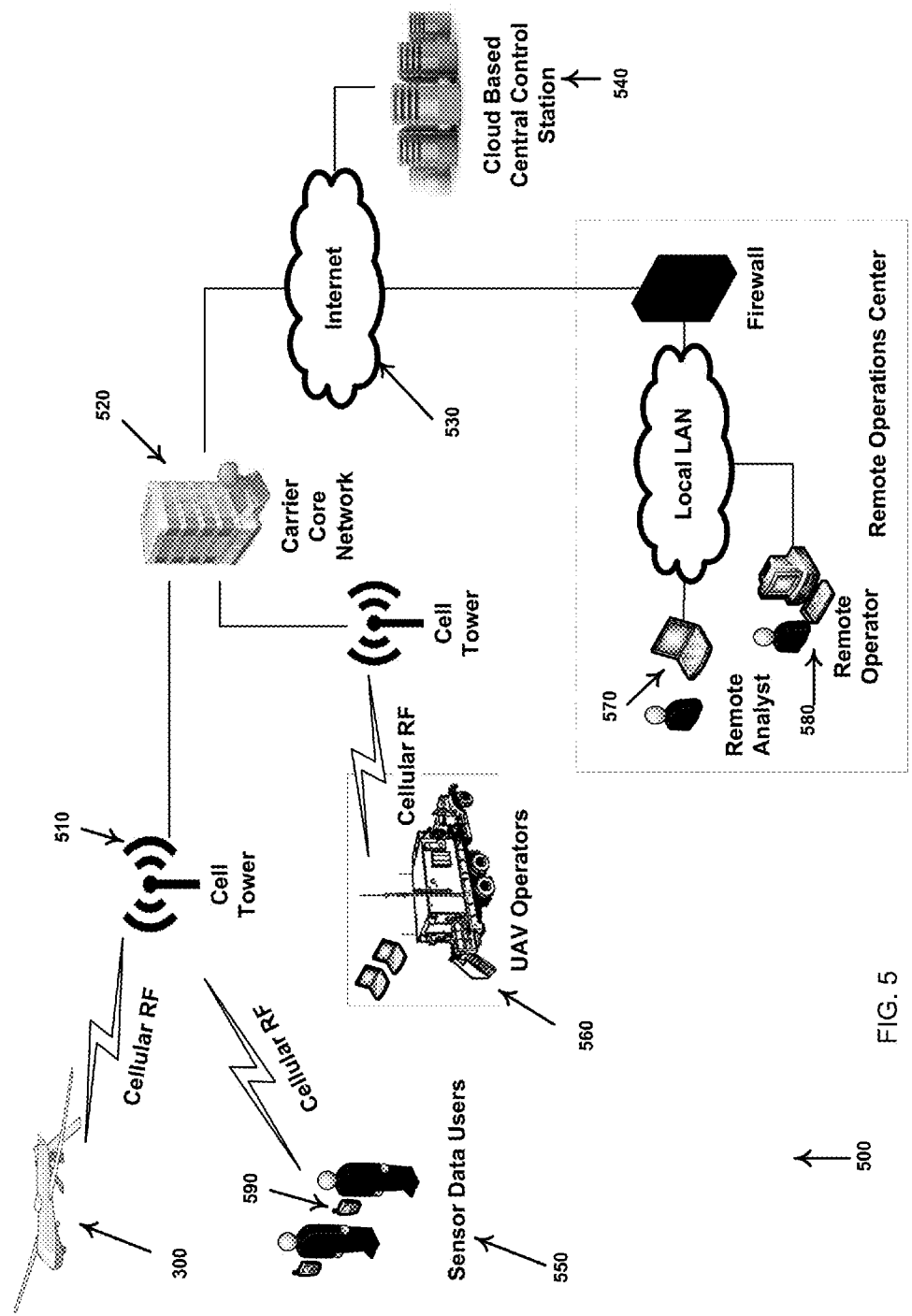
FIG. 5 illustrates an exemplary network environment for a drone using cellular technology.

FIG. 5 illustrates an exemplary network environment 500 for a drone 300. Network environment 500 may be any location where connectivity to drone 300 is supported. Drone 300 may correspond to drone 300 as described above. In various exemplary embodiments, the network environment 500 may be located in an area with commercial cellular coverage. In various embodiments, the network environment may be a private cellular deployment as well. Network environment 500 may include cell towers 510, carrier core network 520, Cloud based control station 540, remote operator 570, remote analyst 580, local drone operators 560, sensor data users 550, and mobile devices such as tablets and handsets 590 and Cloud based control station 540 may be replaced with a local control station in some implementations.

Cell Tower 510 may be a commercial wireless providers radio access network in communication with a Cellular Gateway Module 110 located on board drone 300. In various embodiments, the radio access network may use 3GPP compliment technologies such as 2G, 3G, 4G, LTE, 5G etc. A wireless protocol may be selected based on the location, required data rate, and power needs of the drone.

Carrier Core Network 520 may be a core network of a commercial cellular carrier or a private cellular system.

Internet 530 may be open internet or private intranet enabled by operators existing infrastructure. The connection to the internet can be over fixed WAN or wireless infrastructure.

Local drone Operators 560 may be fixed or a mobile location with laptops/tablets or workstation used to access cloud based Central Control Station 540. In various embodiments, an operator may interact with the drone 300, Cellular Gateway modules 110. For example, as will be explained in further detail below, Central Control Station 540 may be used to control drone 300. As further examples, an operator may use Central Control Station 540 to monitor or manage a sensor 130.

Sensor data users 550 can access data on their handhelds 590 over the cellular network securely. The extent of data accessible may be dependent of the user profile as defined on the cloud Central Control Station for the specific user.

Remote Analyst 570 and Remote operator 580 can access cloud based Control Station 540 using their laptops or workstations. In various embodiments, an operator may interact with the drone 300, Cellular Gateway modules 110. Remote operation 580 has full control of the drone and can change it flight path and mission in real time. Remote Analyst 570 may be a specialist analyzing the sensor data (e.g., video etc.) from the drone or be an observer viewing the data for informational purposes.

Figure 6:
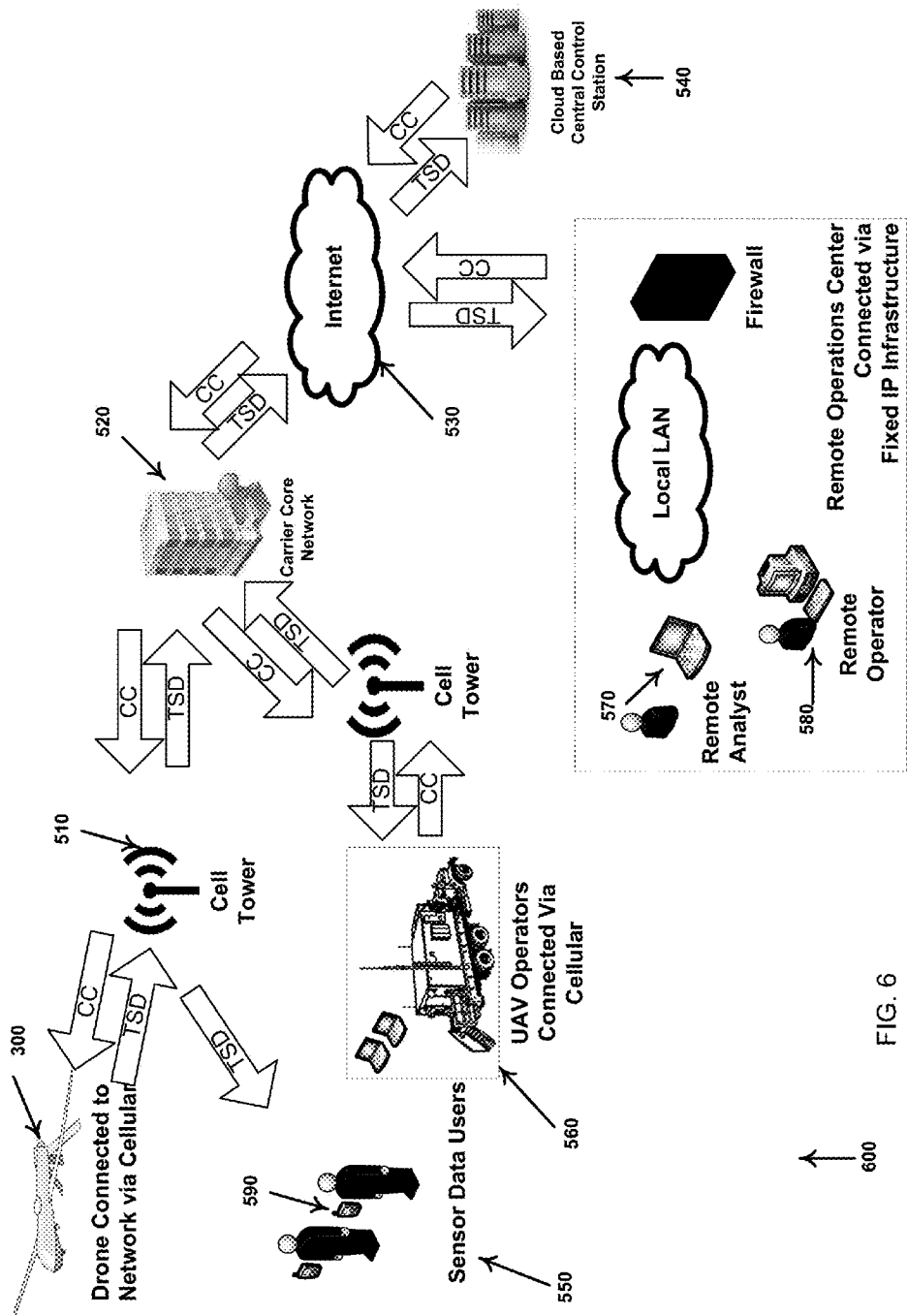
FIG. 6 illustrates data flows in an exemplary drone network using cellular technology.

FIG. 6 illustrates data flows in an exemplary drone network 600. Drone network 600 may include cell towers 510, carrier core network 520, remote operator 570, remote analyst 580, local drone operators 560, sensor data users 550, and mobile devices such as tablets and handsets 590 and Cloud Based Central Control Station 540 accessible from any IP network.

The drone 300 may transmit the telemetry/sensor data via cellular tower 510 using a 3GPP cellular protocol like 2G, 3G, 4G, LTE, 5G etc. to the cloud based Central Control Station 540. Drone 300 may transmit GPS location to the cloud based Central Control Station 540. The cell tower 510 may then transmit the information from cloud based Central Control Station via the carrier core network 520 to other destinations such as internet 530 or Local drone operators 560.

Sensor Data Users 550 using their handheld devices 590 may attach to the cellular network and access the telemetry and sensor data on their devices from the drone 300 via cloud based Central Control Station 540.

Local drone Operators 560 may access the cloud based Central Control Station 540 by connecting to the Internet 530 via Cellular network 510/520. These users can access the sensor data and issue command and control (CC) messages to Drone 300.

Remote Analysts 570 and Operators 580 may access the cloud based Central Control Station 540 by connecting to the Internet 530 via fixed IP WAN network. These users may be able to access the sensor data and issue command and control messages to Drone 400. Remote operation 580 has full control of the drone and can change it flight path and mission in real time. Remote Analyst 570 may be a specialist analyzing the sensor data (e.g., video etc.) from the drone or be an observer viewing the data for informational purposes.

Figure 7:
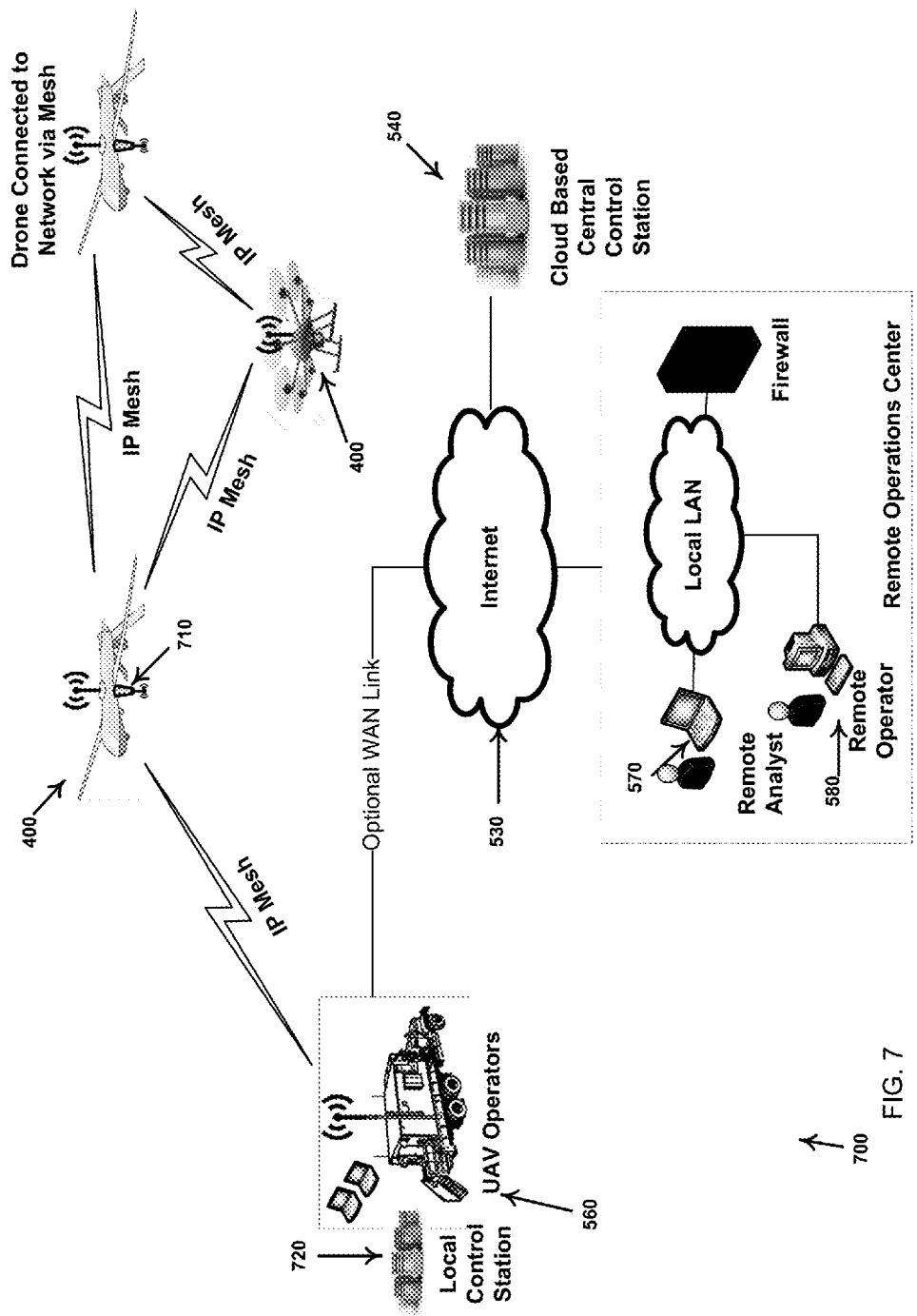
FIG. 7 illustrates an exemplary network environment for a drone using mesh technology.

FIG. 7 illustrates data flows in another exemplary drone network 700. Exemplary drone network 700 may be in an urban or a rural setting.

Network environment 700 may include multiple ground based 560 or airborne 400 drone based mesh nodes, Cloud based ground control station 540, remote operator 570, remote analyst 580, local drone operators 560, and mobile devices such as tablets and laptops 730 and Cloud based Central Control Station 540 and a local Control Station 720 in a mobile environment.

Internet 530 may be open internet or private intranet enabled by operators existing infrastructure. The connection to the internet can be over fixed WAN or wireless infrastructure.

Local drone Operators 560 may be fixed or a mobile location with laptops/tablets or workstation used to access local Control Station 720. In various embodiments, an operator may interact with the drone 400, Mesh modules 120. For example, as will be explained in further detail below, Central Control Station 540 may be used to control drone 400. As further examples, an operator may use Central Control Station application 540 to monitor or manage sensor 130 as long as a WAN link is available with access to the Internet and access to cloud based Central Control Station 540.

Remote Analyst 570 and Remote operator 580 can access cloud based Central Control Station 540 using their laptops or workstations. In various embodiments, an operator may interact with the drone 400, Mesh modules 120.

An operator controlling the drone via a remote control device may guide the drone, and it may be directed to the location via an autonomous method.

Each drone in addition to acting as a mesh end point for airborne drones can act as a peer or connection end point to local Control station 560. The local control station can connect to an airborne drone using this mechanism and enable local command and control as well as sensor data dissemination.

Figure 8:
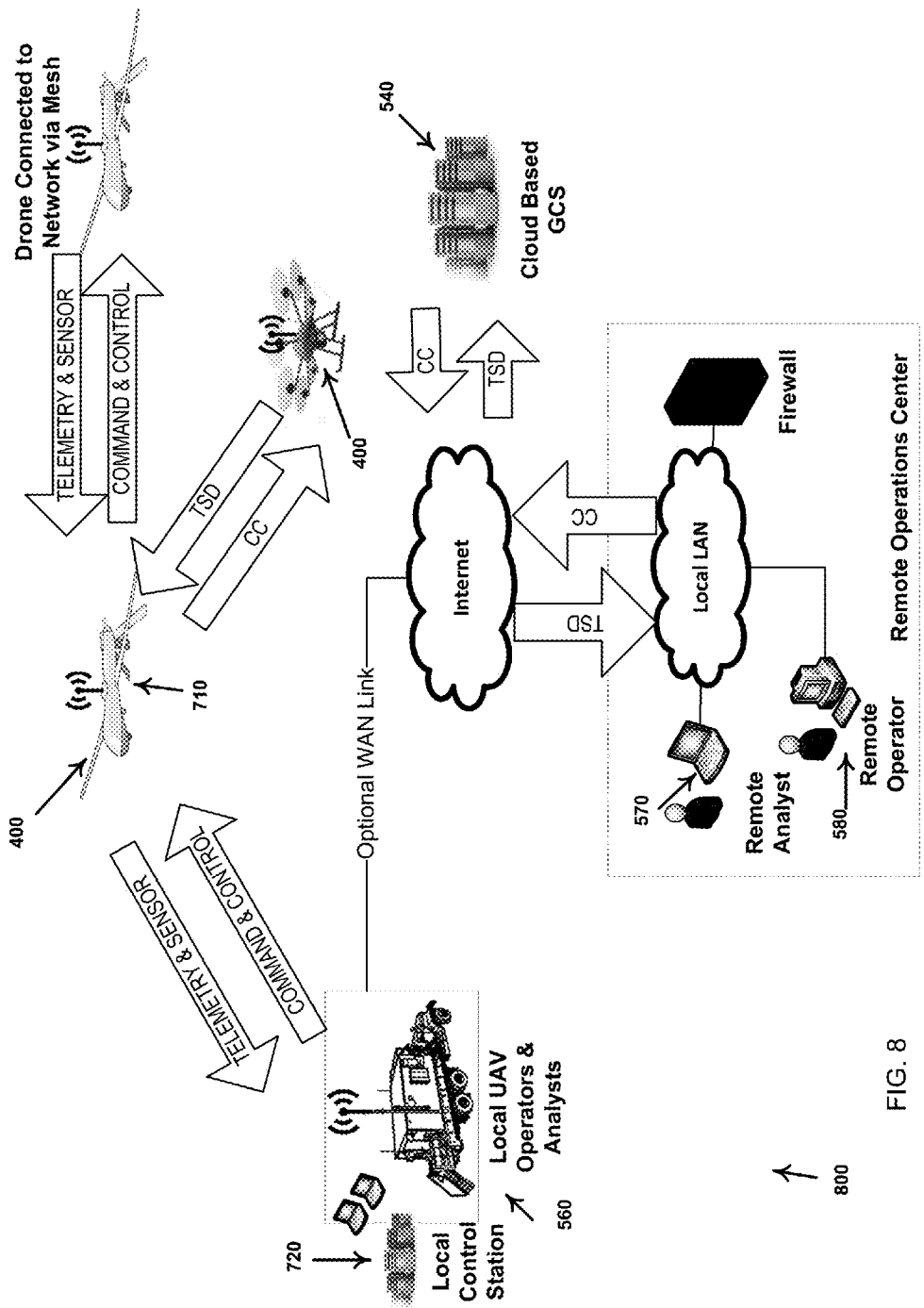
FIG. 8 illustrates data flows in an exemplary drone network using mesh technology.

FIG. 8 illustrates data flows in an exemplary drone network 800. Drone network 800 may include Cloud based ground control station 540, remote operator 570, remote analyst 580, local drone operators 560, and mobile devices such as tablets and handsets 590 and Cloud based Central Control Station 540 accessible from any IP network.

IP Mesh module 240 may be in communication with multiple IP mesh modules during flight of drone 400. IP Mesh module 240 may use security protocols such as WEP, WPA, WPA2, 802.11x, IPSEC, TLS, or SSL to secure wireless communications. RF Filters may be used to limit wireless traffic to prevent interference.

IP Mesh Module 240 may monitors and manages the ad hoc mesh network connections as nodes move in and out of the network.

The drone 400 may transmit the telemetry/sensor data (TSD) to over the mesh module 240 using an IEEE 802.11 or 802.16 wireless component. Drone 400 may transmit GPS location information to other destinations such as internet 530 or Local Control Station 560.

Local drone Operators 560 may access the cloud based Central Control Station 540 by connecting to the Internet 530 via Cellular network 510/520. These users are able to access the sensor data and issue command and control messages to Drone 400.

Remote Analysts 570 and Operators 580 may access the cloud based Central Control Station 540 by connecting to the Internet 530 via fixed IP WAN network. These users are able to access the sensor data and issue command and control messages to drone 400.

An operator controlling the drone via a remote control device may guide the drone, e.g., by entering commands, waypoints into local or cloud based control station application using computer or another supported devices for drone navigation and drone may be directed to the location via an autonomous method.

Figure 9:
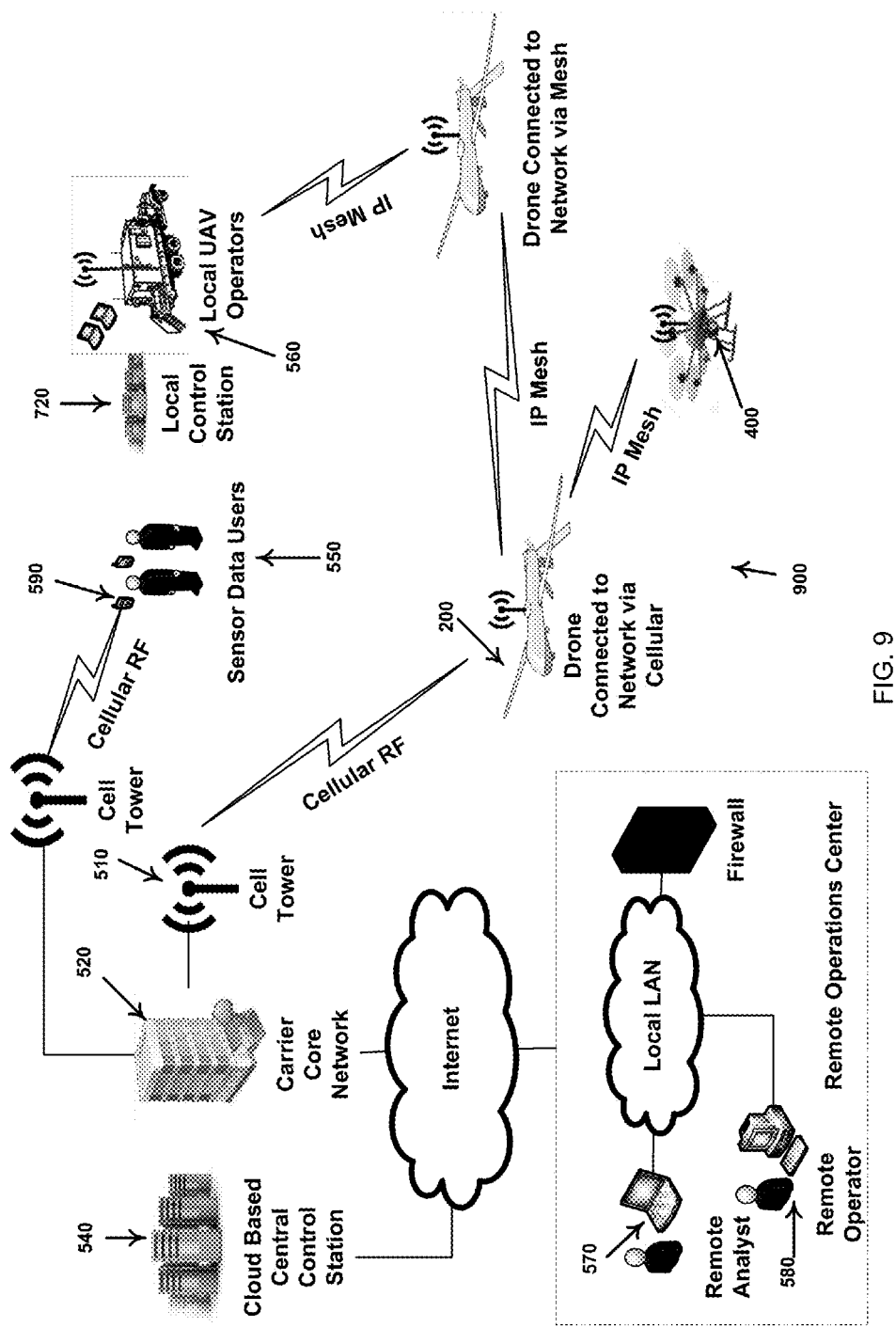
FIG. 9 illustrates an exemplary network environment for a drone using a combination of cellular and mesh technology.

FIG. 9 illustrates data flows in another exemplary drone network 900. Exemplary drone network 900 may be in an urban or a rural setting.

In some implementations, the network environment 900 may include a commercial cellular deployment. In some implementations, the network environment may include another type of cellular deployment, e.g., a private cellular deployment. Network environment 900 may include cell towers 510, carrier core network 520, multiple ground based 560 or airborne 200 drone mesh nodes, 400 mesh nodes, Cloud based Central Control Station 540, remote operator 570, remote analyst 580, local drone operators 560, sensor data users 550, and mobile devices such as tablets and laptops 730 and Cloud based Central Control Station 540 and a local control station 720 in a mobile environment.

Cell Tower 510 may be a commercial or private cellular radio access network in communication with a Cellular Gateway Module 110 located on board drone 200. In various embodiments, wireless access point may use 3GPP compliment technologies such as 2G, 3G, 4G, LTE, 5G etc. A wireless protocol may be selected based on the location, required data rate, and power needs of the drone.

Carrier Core Network 520 may be a core network of a commercial cellular carrier or a private cellular system. Internet 530 may be open internet or private intranet enabled by operators existing infrastructure. The connection to the internet can be over fixed WAN or wireless infrastructure.

Local drone Operators 560 may be fixed or a mobile location with laptops/tablets or workstation used to access local Control Station 720. In various embodiments, an operator may interact with the drone 200, Mesh modules 120. For example, as will be explained in further detail below, Central Control Station 540 may be used to control drone 200 or 400. As further examples, an operator may use Central Control Station application 540 to monitor or manage sensor 130 (e.g., using Pan, Tilt, Zoon functionality of an onboard camera) as long as a WAN link is available with access to the Internet and access to cloud based Control Station 540.

Remote Analyst 570 and Remote operator 580 can access cloud based Central Control Station 540 using their laptops or workstations. In various embodiments, an operator may interact with the drone 200, Mesh modules 120.

An operator controlling the drone via a remote control device may guide the drone, e.g., by entering commands, waypoints into local or cloud based control station application using computer or another supported devices for drone navigation and drone may be directed to the location via an autonomous method.

Figure 10:
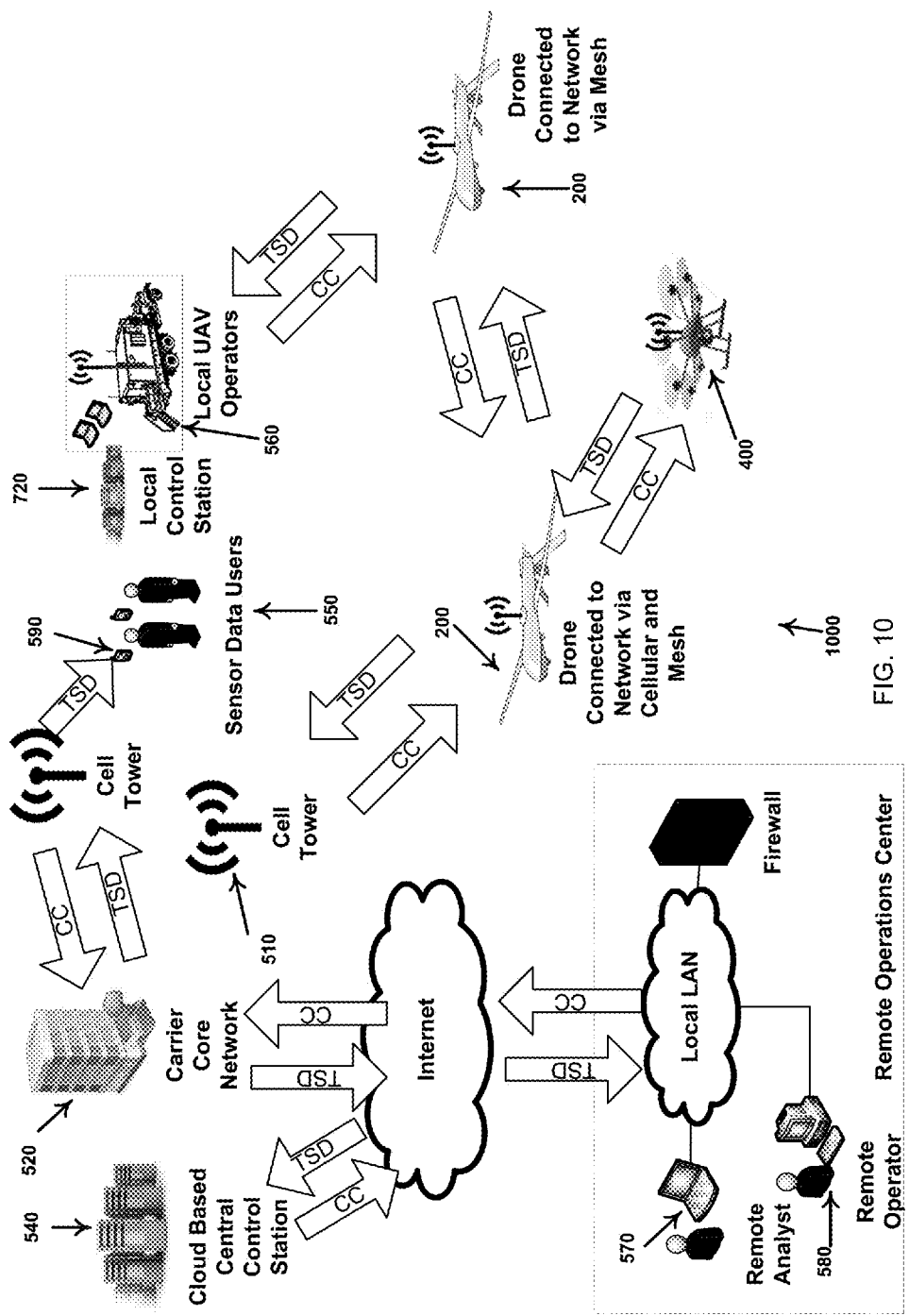
FIG. 10 illustrates data flows in an exemplary drone network using a combination of cellular and mesh technology.

FIG. 10 illustrates data flows in an exemplary drone network 1000. Drone network 1000 may include cell towers 510, carrier core network 520, Cloud based Central Control Station 540, remote operator 570, remote analyst 580, local drone operators 560, sensor data users 550, and mobile devices such as tablets and handsets 590 and Cloud based ground control station 540 accessible from any IP network.

IP Mesh module 240 may be in communication with multiple IP mesh modules during flight of drone 200 or 400. IP Mesh module 240 may use security protocols such as WEP, WPA, WPA2, 802.11x, IPSEC, TLS, or SSL to secure wireless communications. Filters may be used to limit wireless traffic to prevent interference.

The drone 200 may transmit the telemetry/sensor data to Cloud based Central Control Station 540 using commercial cellular radio access network via 510 using a 3GPP cellular protocol like 2G, 3G, 4G, LTE, 5G etc. Drone 200 may transmit GPS location information to Central Control Station 540. The cell tower 510 may then transmit the information via the carrier core network 520 to other destinations such as internet 530 or remote drone operators 580.

Sensor data Users 550 using their handheld devices 590 may attached to the cellular network and access the telemetry and sensor data on their devices from the drone 200 via cloud based Central Control Station 540.

Local drone Operators 560 may access the cloud based Cloud based Central Control Station 540 by connecting to the Internet 530 via Cellular network 510/520. These users may be able to access the sensor data and issue command and control messages to Drone 200 or 400.

Remote Analysts 570 and Operators 580 may access the cloud based Control Station 540 by connecting to the Internet 530 via fixed IP WAN network. These users may be able to access the sensor data and issue command and control messages to Drone 200.

The drone 200 may transmit the telemetry/sensor data to over the mesh module 240 using an IEEE 802.11 or 802.16 wireless component. Drone 200 may transmit GPS location information to other destinations such as internet 530 or Local drone operators 560.

Sensor data Users 550 using their handheld devices 590 may attached to the cellular network and access the telemetry and sensor data on their devices from the drone 200 via cloud based Control Station 540.

An operator controlling the drone via a remote control device may guide the drone, and it may be directed to the location via an autonomous method.

Figure 11:
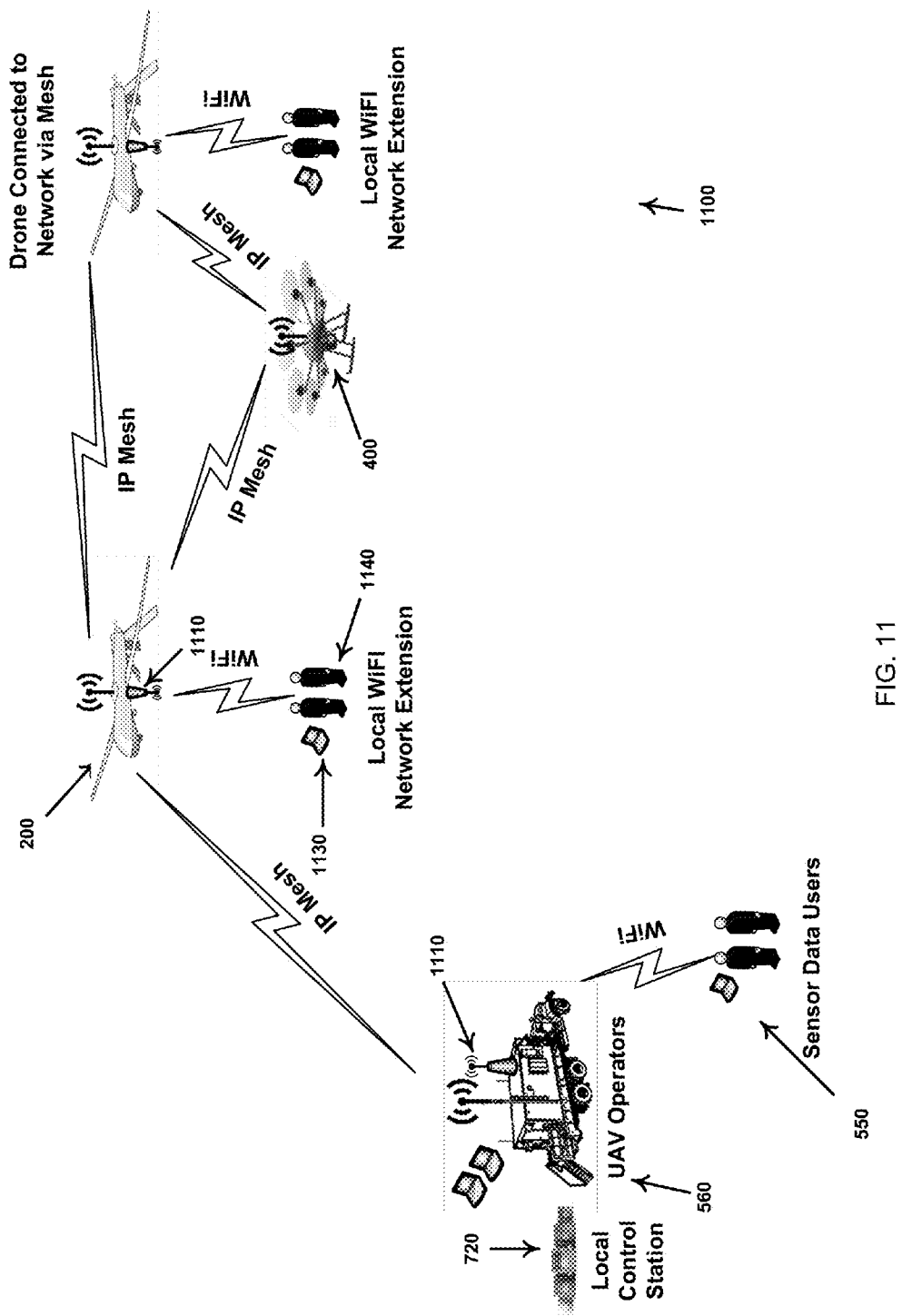
FIG. 11 illustrates an exemplary network environment for a drone using mesh and an on board WiFi access point to provide users of the ground an airborne network.

FIG. 11 illustrates data flows in another exemplary drone network 1100. Exemplary drone network 1100 may be in an urban or a rural setting.

Network environment 1100 may include multiple ground based 560 or airborne 400 drone based mesh nodes, Wi-Fi Modules 1110, local drone operators 560, sensor data users 550, and mobile devices such as tablets and laptops 1130 and a local ground control station 720 in a mobile environment.

Local drone Operators 560 may be fixed or a mobile location with laptops/tablets or workstation used to access local Central Control Station 720. In various embodiments, an operator may interact with the drone 400, Mesh modules 120; monitor or manage sensor 130 as long as the drone mesh network is operational.

An operator controlling the drone via a remote control device may guide the drone, and it may be directed to the location via an autonomous method.

Each drone in addition to acting as a mesh end point may offer a local WiFi Network Extension 1130 to end users 1140.

Figure 12:
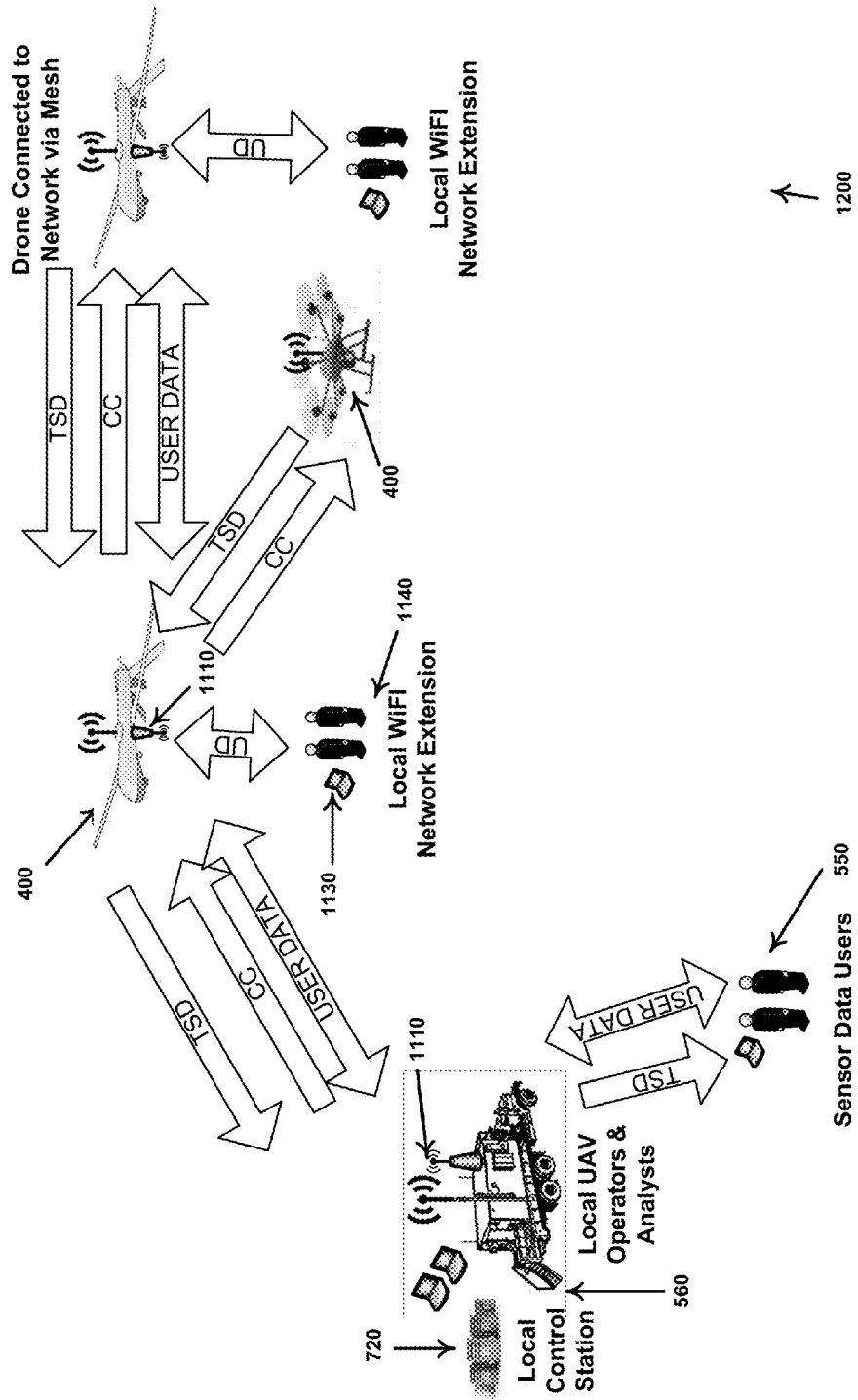
FIG. 12 illustrates data flows in an exemplary drone network using mesh using mesh and an on board WiFi access point to provide users of the ground an airborne network.

FIG. 12 illustrates data flows in an exemplary drone network 1200. Drone network 1200 may include local drone operators 560, and mobile devices such as tablets and handsets 590 and IP Mesh module 240 may be in communication with multiple IP mesh modules during flight of drone 400. IP Mesh module 240 may use security protocols such as WEP, WPA, WPA2, 802.11x, IPSEC, TLS, or SSL to secure wireless communications. Filters may be used to limit wireless traffic to prevent interference.

IP Mesh module 240 may monitor and manages the Ad-hoc mesh network connections as nodes move in and out of the network.

The drone 400 may transmit the telemetry/sensor data/ user data (UD) to over the mesh module 240 using an IEEE 802.11 or 802.16 wireless component. Drone 400 may transmit GPS location information to destinations such Local Control Station 560.

Local drone Operators are able to access the sensor data and issue command and control messages to Drone 400.

An operator controlling the drone via a remote control device may guide the drone, and it may be directed to the location via an autonomous method.

Each drone in addition to acting as a mesh end point may offer a local WiFi Network Extension 1130 to end users 1140.

Figure 13:
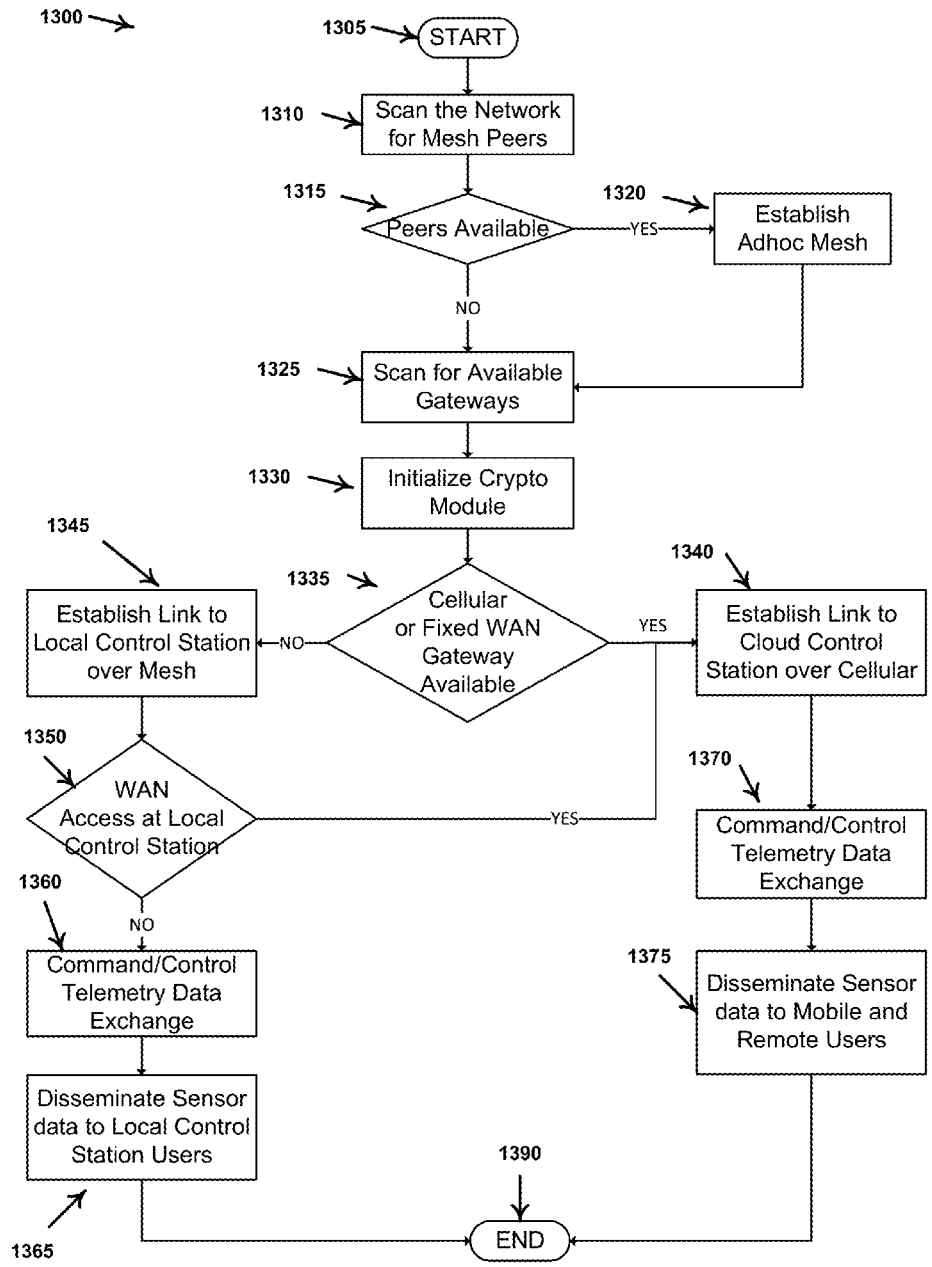
FIG. 13 illustrates sample data flow for a drone enabled with both cellular and mesh modules.

FIG. 13 illustrates a reference flow chart showcasing a sample interaction and data flow for a combine cellular and mesh architecture.

In various embodiments, method 1300 may be performed by a drone such as drone 200, which has been configured with electronics components such as Cellular Gateway Module 230, IP Mesh Module 240, and Crypto Module 250. Method 1300 may begin at step 1305 and proceed to step 1310.

In step 1310, the drone may search for available mesh nodes in the area. The information may be received by IP Mesh Module 240. In step 1315, drone 200 may check for authorized mesh nodes based on the results from 1310.

If other authorized mesh nodes are available, in step 1320, IP Mesh Module 240 may establish the airborne mesh network.

In step 1325, the drone 200 may search for available gateways for access to the internet using the Cellular Gateway Module 230 on board each drone or using the ground based local control station. Once a gateway is identified, the onboard encryption crypto module 250 is initialized.

In step 1330, the drone 200 may check to see if the identified gateway in previous step is a cellular airborne gateway 230 or a Fixed WAN network via a local control station 720.

Based on the result of the check in step 1330, a secure encrypted link may be established to the local control station in step 1345 or to a cloud based control station in step 1340.

In step 1350, based on the existence of a WAN link at the local control station, the secure link may be extended to the cloud based control station.

In steps 1360 and 1370, the drone 200 may share command and control and telemetry data between the drone and the operators 560 or 580. In step 1365 and 1375, sensor data such as video may be disseminated to local or remote sensor data user 550. The method 1300 may proceed to step 1390 where the method ends.

If a drone is operated using a Cellular module alone and has no access to mesh so it would only use the cell connection to get to the cloud based control station. If the drone has mesh node alone, it may look for a WAN connection, e.g., direct or via other drones, from the local ground control station for access to cloud based control station. If no WAN link is found, it may use the local control station available at the ground location in the area of operation and command and control. If the drone has both cellular and mesh modules, it may search for all active paths available to get to the cloud based control station, be it cellular link on the drone or a link via a WAN connection at local control station. The system may choose the link that provides greater bandwidth, the least latency, or both.

In some implementations, the systems and methods described in this document determine how to use intelligence to handle a dynamic drone network size, a dynamic drone network topology, or both, of the drones in a network, e.g., that are connected together and share data. The systems and methods may use decentralized strategies in which all the nodes, e.g., drones, make decisions independently and autonomously from the other drones centered on the exchange of information with their neighbors. The nodes may make decisions independently from the other drones using data received from the other drones, e.g., when the data indicates properties of the drone network, such as available network connections, connection types, connection bandwidths, or a combination of two or more of these, properties of a command and control center, properties of a control station, or other appropriate types of data.

In some examples, the nodes in a drone network, e.g., an airborne mesh network, may detect other peer nodes, in the drone network or currently not connected to the drone network, determine the best way to route in the drone network with which to communicate with other nodes in the drone network, the command and control center, a control station, or a combination of two or more of these. In some examples, some of the nodes in the drone network may keep track of the new nodes that connect to the node and informs its neighbors about the existence of the new nodes. For instance, when a particular node receives a request from another node that is not currently part of the drone network and is requesting access to the drone network, the particular node creates a connection with the other node, e.g., to bring the other node into the drone network, and sends one or more messages to the nodes with which the particular node is connected that identifies the other node and indicates that the other node connected to the drone network. The neighbors can then subsequently relay this message, or another message about the new node, to their neighbors enabling the dissemination of information to all the nodes in the drone network.

In some implementations, nodes in the drone network may use information included in the new node messages to determine an optimal communication path with the new node. For instance, each node may count the number of originator messages received for a particular new node and use the original messages to determine which nodes the messages came through, e.g., by analyzing data in the messages that indicates the nodes through which a particular message passed. When a node sends a message to another node about the existence of a new node, the node may add information to the message that indicates that the node received the message and forwarded data from the message to other nodes in the drone network, e.g., the node may add a node identifier for the node to the message sent to the other nodes.

In some implementations, a node can inform other nodes in the drone network whether the node has access to a computer network, e.g., a wide area network or the internet, and the node can act as gateway for the drone network, e.g., and communicate with a control station such as a cloud based control station. The other nodes in the drone network can evaluate which node gateway to use based on criteria such as available bandwidth, latency, or both, of the respective node gateway.

In some examples, the nodes in the drone network may share telemetry data with other nodes in the drone network, e.g., in addition to or instead of with a control system. The telemetry data may include, for example, an attitude (e.g., roll, pitch, and yaw), an altitude, a GPS position, a speed, a battery voltages, another appropriate property of the node, or a combination of two or more of these. A command and control center, a control station, another appropriate type of control system, or a combination of two or more of these, may use telemetry channels to send instructions to one or more drones in a drone network while the drones are moving, e.g., in flight.

Based on the data received from each airborne mesh node in the drone network, the control system determines navigation instructions for at least some of the nodes in the drone network. For instance, the control system may handle traffic management such as collision avoidance, flight path monitoring, and real time navigation for some or all of the drones in the drone network. The control system may use a projected trajectory, telemetry data, and performance data, received from the drone network, to determine navigation instructions for a drone.

In some examples, a control system may use data from external data sources to determine navigation instructions for a drone. For instance, the control system may receive data from external data sources such as the Federal Aviation Administration (FAA) which includes datasets that identify hazards, obstacles, airspace restrictions, notices to airmen, and other appropriate types of data from the FAA. External data may include self-reported vehicle positions, e.g., received from the FAA based on user input from ground based controllers. External data may include data from traffic management systems, such an automatic dependent surveillance-broadcast (ADS-B) systems or air traffic control (ATC) systems. The control system may use a combination of data from different sources to create a common operational picture which shows the state of all the nodes in the network.

The control system may use data from some of the sources or from all of the sources to identify risks for some of the drones in the drone network such as an impending collision of a drone into an object or inadvertent flying of a drone into an area which would violate constraints such as airspace. The control system may weigh the different types of data and determine an appropriate avoidance procedure for a particular drone or for multiple drones which may involve a change of course or any other applicable corrective maneuver for a drone. The control system may send a notification to an operator device about a recommended course of action or, if enabled, automatically send a course correction command to a drone, e.g., to an onboard autopilot of the drone, in real time.

In some implementations, the control system may receive traffic information for non-cooperating assets, e.g., for assets which the control system does not provide navigation instructions to. The control system may prioritize corrective action for a drone based on the traffic information for the non-cooperating assets by comparing the traffic information for the non-cooperating assets with data received from the nodes in the drone network.

In some examples, a drone in the drone network may be constantly in communication with the control system, e.g., throughout a mission for the drone. The control system may receive data from an operator device before a mission is started. For instance, the control system may receive data identifying a flight plan based on the desired mission area from the operator device. Data for the flight plan can identify a list of satellite navigational points (e.g., GPS coordinates), a geographical area (a polygon), or other appropriate data for a flight plan. Once the control system receives a flight plan from an operator device, the control system performs constraint validation checks of the flight plan to ensure compliance of the flight plan to one or more flight rules. For instance, the control system may perform air space validation, terrain and obstacle checks, and vehicle performance based checks, and determine FAA temporary flight restrictions, notices to airmen, and weather data, e.g., predicted weather data, for the flight plan. If the control system determines that all constraint validations pass, the control system may allow the operator device to activate the flight plan, e.g., to cause a launch of a drone for the flight plan, may save the flight plan for a future use, or both. In some examples, the control system, as part of the mission creation process, may receive data from the operator device that indicates vertical separation thresholds, horizontal separation thresholds, or both, that define minimum distances between the drone moving through the flight path and another vehicle or an obstacle. The thresholds may be specific to a particular mission, particular flight path, or for all missions and flight paths define by the operator device.

Once the control system activates a flight plan, e.g., in response to data from an operator device indicating activation of the flight plan, the control system sends instructions to a drone to cause the drone to travel a path that aligns with the flight plan. For instance, the control system sends the instructions to the drone over encrypted links in real time. The instructions may cause the drone to perform one or more pre-flight checks, e.g., that determine whether the drone is able to perform a mission. The control system may receive data from the drone that indicates that the pre-flight checks have passed and may provide, to the operator device, a message that indicates that the pre-flight checks have passed.

The control system may receive, from the operator device, data that indicates that the operator device trigger the launch of a mission (e.g., drone launch). In response, the control system provides the drone with instructions to cause the drone to launch and move along the flight path for the mission.

Once the drone has launched, e.g., and the mission is underway, the control system continuously tracks the physical location of the drone, e.g., using GPS data received directly or indirectly from the drone. The control system may receive data indirectly from the drone using a drone network as described above. For example, upon power on or upon launch, the drone may search for other drones with which to establish a drone network, may search for computer network connections with which to communication with the control system, or both. Once the drone determines either a drone network or a computer network, the drone, the control system, or both, determine a predicted shortest path of communication between the drone and the control system. The predicted shortest path may be a path with a fewest number of nodes between the drone and the control system; a path with the shortest latency for messages passed between the drone and the control system; a predicted shortest path based on data available to the drone, the control system, or both; or a combination of two or more of these. The shortest latency may be a latency for messages sent from the control system to the drone, a latency for messages sent from the drone to the control system, or a combination of both.

The control system may provide data representing the physical location of the drone to another device. For instance, the control system may provide the data to the operator device to cause the operator device to display the visual location of the drone along with other drones operating in the same geographical area on a user device dashboard user interface.

While the drone is in flight, the control system may continuously check the active flight path for the mission for constraints, violations or potential collisions. For instance, the control system may determine navigation instructions that adjust the current flight path for the drone based on data received from one or more sources, such as the drone, other drones in the drone network, the external sources, or a combination of two or more of these. The control system provides the navigation instructions to the drone to cause the drone to adjust the physical flight path of the drone. The control system may determine the navigation instructions to maintain the original flight path as much as possible, to maintain drone travel to particular waypoints on the flight path, or to otherwise align the actual flight path as much as possible with the original flight path in view of changing conditions.

In some examples, the control system may receive sensor data from a drone, e.g., over the mesh network via the appropriate active gateway at that time. The control system may provide the sensor data to the operator device, e.g., to cause presentation of the sensor data on the operator device. Some examples of sensor data include video data, e.g., visible light or another frequency, thermal data, infrared data, electro-optical (EO) data, sonar data, and radar data.

The control system may receive information about the topology of the drone network, e.g., data identifying the number of drones in the drone network, data indicating connections between drones in the drone network, data indicating available and active gateways, or a combination of two or more of these. The control system may provide some or all of the data received from a drone or on behalf of a particular drone in real time to another device, e.g., for real time access to the data, for archiving of the data for offline dissemination, or both.

The control system may share the data received from a drone or on behalf of a drone with external sources to provide situational awareness of the drones. For instance, the control system may provide drone data to an airport system, an air traffic control system, a hobbyist system, e.g., flying manual drones, to provide one or more of the other systems with situational awareness. The other systems may use the drone data for control of other objects, e.g., other airborne objects such as planes. For example, some of the other systems may use the drone data for their own mission planning.

In some examples, the control system may archive drone data, e.g., sensor data, received from the drone. For example, the control system may provide the drone data to a database for archival after the drone scans an agriculture field. The drone data may include imagery data received from the drone. The control system may share the drone data with a third party analytics system, e.g., identified by an entity that requested a drone mission, for post processing of the captured drone data.

In some implementations, the control system may enable an operator device to take over manual control of a drone during a mission by switching the drone into a guided mode and by suspending the automated mission. For instance, the control system may receive data indicating that the operator device triggered a "Return to Launch", "Land", or "Loiter" option. In some examples, the control system can send commands to a drone for sensor management, for example changing the pan tilt zoom for an onboard electro-optical (EO) or infrared (IR) camera, depending on the type of sensor onboard the drones.

In some implementations, nodes within a node network may share sensor and telemetry data. For example, a first drone may provide a second drone with sensor data, telemetry data, or both, to enable the second drone to use the received data for collision avoidance. In some examples, a drone may provide data to another drone in case a connection to the control system or the local control station is lost. When the connection is lost, the drones can share data with each other for collision avoidance and separation assurance. In some examples, the drones may always share data with each other for collision avoidance. In some examples, when a drone determines that a connection with the central system or the local control station, or both, is lost, the drone provides sensor data, telemetry data, or both, to another drone for collision avoidance. In some examples, when a drone determines that a connection with the central system or the local control station, or both, is lost, the drone may request sensor data, telemetry data, or both, from another drone and use the received data for collision avoidance.

In some implementations, the nodes within a node network may share details about communication links, e.g., network topology, with other nodes, such as signal strength, noise levels, and potential interference levels, e.g., for optimization of network communications. A node may share network topology information to ensure that other nodes in the network are able to maintain a link with a control system, a local control station, or both, e.g., to provide payload information to the control system, the local control station, or both. In some examples, the nodes may share network topology information to enable other nodes in the network to maintain a continuous link, e.g., an uninterrupted link, with a control system, a location control station, or both. The nodes may provide the details about the communications links to the control system. The control system or another device, e.g., an operator device, may use the details about the communications links to generate a visual user interface that depicts information about the node network. For instance, the visual user interface may allow user input to rearrange a mesh topology by adding or removing drones from the drone network, rearranging communications paths between the drones in the drone network, or a combination of two or more of these. The visual user interface may allow user input to optimize performance of the drone network. In some examples, the control system may analyze the details about the communications links to determine optimizations for the drone network, e.g., the removal, addition, or rearrangement of a drone in the drone network.

In some implementations, when no gateway is available during a mission for a drone to access to a wide area network and communicate with a control system, the mesh nodes, e.g., drones, may route data to a designed local control station. The designated local control station may enables communication between the drone and one or more local operator devices. At any point if a gateway with access to a wide area network, e.g., the internet, becomes available, the drone may initiate communication with the control system automatically.

The control system may support rule based access control, e.g., to data from one or more drones, control of one or more drones, or both. For instance, the control system may include access levels as an administrator, a pilot, an observer, or an analyst. The control system may apply one of the access levels to each of the operator devices, e.g., to grant permissions for the corresponding access level and role to the respective operator device. For example, an administrator access level may grant a corresponding device all permissions, e.g., access to all data and all control. A pilot access level may have permissions for flight control and flight status monitoring of a drone and access to corresponding data, e.g., but not to sensor data from a drone that is not relevant to flight control. An analyst access level may allow control of one or more sensors that are not specific to flight control, e.g., a camera tilt and video access.

In some implementations, the control system enables a multi-operator network in which one operator device can control multiple drones, one drone can be controlled by multiple operator devices, or both. For example, the control system ensures that only one primary operator device is active and has control of a particular drone at any given time. The control system maintains any additional operator devices in a standby mode in which the additional operator devices cannot issue navigation commands to the drone while the primary operator device has control of and can send navigation commands to the drone. The control system may allow the primary operator device to delegate to or exchange control with another operator device as needed.

In some implementations, some of the devices included in the system can be at geographically distant locations. For instance, the control system may be at a first physical location, a primary operator device may be at a second physical location, and a secondary operator device may be at a third physical location, in which each of the physical locations are geographically dispersed. The control system may allow each of the devices to access corresponding interfaces. Some examples of the devices may include as laptops, tablets, workstations and mobile devices.

In some examples, a drone flying over a California coastline can be controlled by an operator device in Virginia while an analyst device, in Colorado, controls the payload of the drone and reviews the sensor data. The control system may be physically located in Minnesota. In parallel, a second operator device can be based in Texas.

In some implementations, the control system may be a cloud based control station. The cloud based control station may acts as a cloud-processing layer, which can scale in real-time depending on usage requirements and complexity of deployment models and missions.

The control system may include a flight planning service module. The flight planning service module may generate an operational plan for missions, provide data to an operator device for generation of a plan, or both. The control system or the flight planning service module may check operational plans against all known constraints to determine the validity of a flight plan. These constraints can be grouped at a high level based on either the deterministic or the probabilistic constraints, e.g., by type of constraints. For instance, deterministic constraints may be constraints that remain constant throughout a mission such as terrain which does not change. Some examples of deterministic constraints include airspace restrictions, terrain, obstacles, vehicle characteristics, communication data, navigation data, and notices to airmen. Probabilistic constraints may be constraints that may change at any time during a mission such as weather. Some examples of probabilistic characteristics include weather, risk, and trajectory.

A control system may archive flight data, telemetry data, or both. The control system may archive data received from a drone in real time. The control system or another system may use the archived data for post processing, reporting, or both. For example, an analytics system may analyze some of the data using multi spectral analysis to determine what parts of a field, a pasture, or both, included on a farm may need more water.

In some implementations, a control system may enable tracking and management of flight data, equipment, locations, maintenance operations, incidents, and documents. For instance, a control system may determine data in real time regarding the use of the equipment included in a drone, such as how long particular parts have been used, and determine when the equipment should be serviced. The control system may maintain a separate log for each part included in the drone such as a separate log for each motor, each sensor, each computer, or a combination of two or more of these.

A drone may include command and control Cellular Gateway module used to share telemetry, command and control as well as sensor information with a central control station; and an IP Mesh module capable of independent and mesh operations using self-healing and self-organizing technology. The Cellular and Mesh modules may be configured to receive command and control information to relay to onboard navigation system. The drone may include a sensor payload proxy enabling real time IP sensor data; and auto pilot proxy capable to sharing telemetry data/command and control with cloud based or local control station. The drone may include a sensor payload proxy enabling real time IP sensor data; and auto pilot proxy capable to sharing telemetry data/command and control with cloud based or local control station. The processor module may be configured to route the telemetry and sensor data to a remote cloud based control station over cellular. The processor module may be configured to route the telemetry and sensor data to a local or remote cloud based control station over mesh. The drone may include a weatherized electronics casing surrounding the Cellular Gateway, IP mesh, Crypto, Navigation Gateway, Sensor Payload Gateway and Processor modules. The drone may enable AES 256 and Suite B encryption using a crypto engine between the various nodes and end points of the network. The drone may include comprising a plurality of rotors.

The drone may perform a method including transmitting and receiving telemetry, sensor, command and control data to other nodes in the mesh network; navigating the drone along the waypoints communicated from the control station based on satellite location signals; determining current position information based on the satellite location signals; and transmitting the information and the current position information to a local or cloud based control station. The drone may detects the optimum gateway or route available for access to the central station. The drone may share peer location, neighbor, and signal strength information with other mesh nodes including defining a minimum separation distance. The drone may determine the available bandwidth for each of the hops as well as the bandwidth available via all available gateways to either local or remote cloud based control station; and selecting the best available gateway and packet routing path. A network system may include an internet protocol mesh network using multiple drones as mesh nodes and leverage commercial cellular networks where available share data with a wider area network. The network may enable control of multiple drones from a centralized location. The network may enable converge command and control, video and telemetry data exchange over a single encrypted link. The network may enable drone dissemination of sensor data to users across the globe over the internet securely. The drone may be an unmanned aerial vehicle comprising a plurality of rotors.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 14:
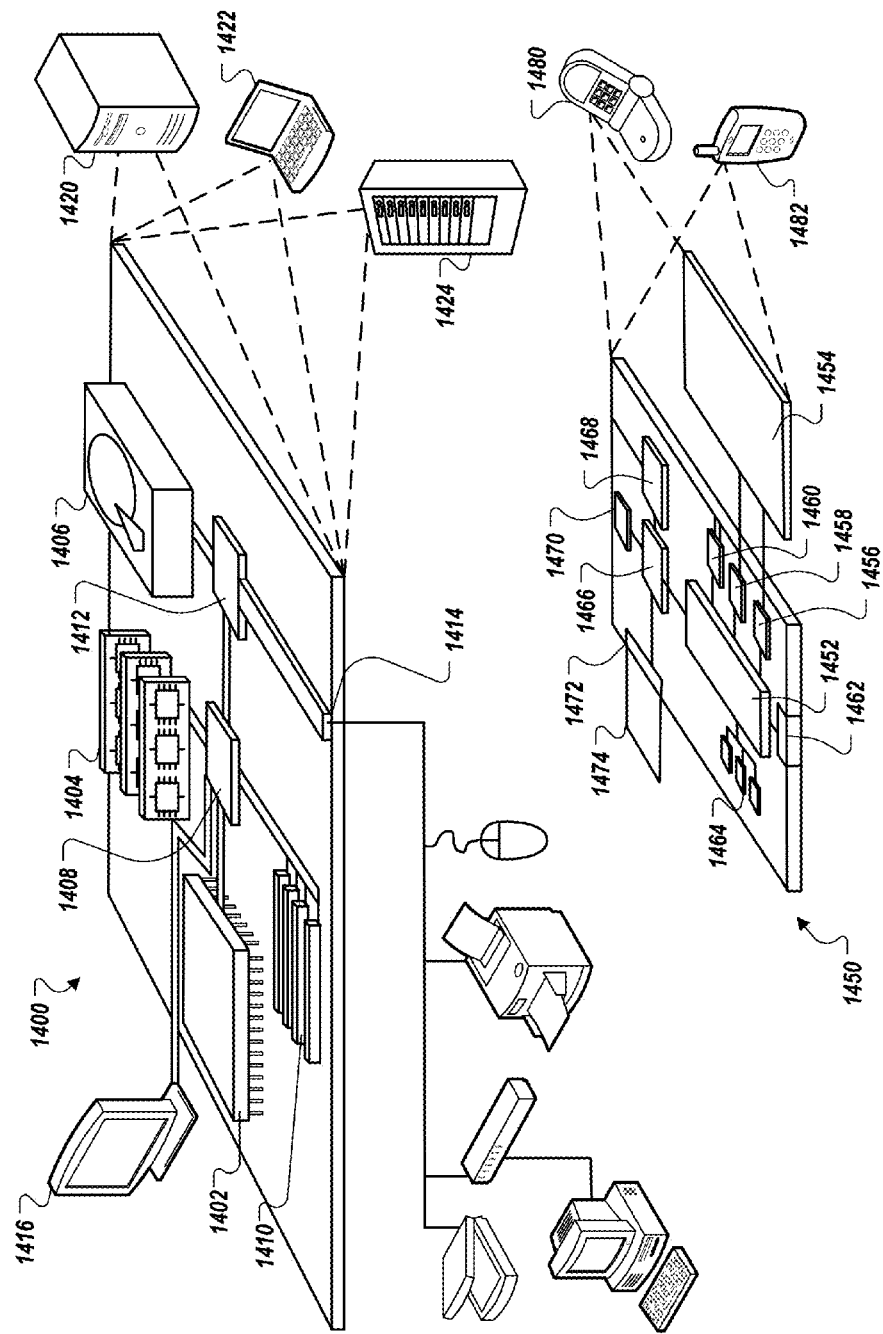
FIG. 14 is a block diagram of a computing system that can be used in connection with computer-implemented methods described in this document.

FIG. 14 is a block diagram of computing devices 1400, 1450 that may be used to implement the systems and methods described in this document, as either a client or as a server or plurality of servers. Computing device 1400 is intended to represent various forms of digital computers, such as laptops, desktops, workstations, personal digital assistants, servers, blade servers, mainframes, and other appropriate computers. Computing device 1450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations (e.g., as a server bank, a group of blade servers, or a multi-processor system).

The memory 1404 stores information within the computing device 1400. In one implementation, the memory 1404 is a computer-readable medium. In one implementation, the memory 1404 is a volatile memory unit or units. In another implementation, the memory 1404 is a non-volatile memory unit or units.

The storage device 1406 is capable of providing mass storage for the computing device 1400. In one implementation, the storage device 1406 is a computer-readable medium. In various different implementations, the storage device 1406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1404, the storage device 1406, or memory on processor 1402.

The high speed controller 1408 manages bandwidth-intensive operations for the computing device 1400, while the low speed controller 1412 manages lower bandwidth-intensive operations. Such allocation of duties is exemplary only. In one implementation, the high-speed controller 1408 is coupled to memory 1404, display 1416 (e.g., through a graphics processor or accelerator), and to high-speed expansion ports 1410, which may accept various expansion cards (not shown). In the implementation, low-speed controller 1412 is coupled to storage device 1406 and low-speed expansion port 1414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can process instructions for execution within the computing device 1450, including instructions stored in the memory 1464. The processor may also include separate analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD display or an OLED display, or other appropriate display technology. The display interface 1456 may comprise appropriate circuitry for driving the display 1454 to present graphical and other information to a user. The control interface 1458 may receive commands from a user and convert them for submission to the processor 1452. In addition, an external interface 1462 may be provide in communication with processor 1452, so as to enable near area communication of device 1450 with other devices. External interface 1462 may provide, for example, for wired communication (e.g., via a docking procedure) or for wireless communication (e.g., via Bluetooth or other such technologies).

The memory 1464 stores information within the computing device 1450. In one implementation, the memory 1464 is a computer-readable medium. In one implementation, the memory 1464 is a volatile memory unit or units. In another implementation, the memory 1464 is a non-volatile memory unit or units. Expansion memory 1474 may also be provided and connected to device 1450 through expansion interface 1472, which may include, for example, a SIMM card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provide as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include, for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, WiFi, or other such transceiver (not shown). In addition, GPS receiver module 1470 may provide additional wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound (e.g., voice messages, music files, etc.) and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An unmanned vehicle comprising:
   a cellular gateway module;
   an internet protocol mesh module;
   a data processing apparatus; and
   a non-transitory computer readable storage medium in data communication with the data processing apparatus and storing instructions executable by the data processing apparatus and upon such execution cause the data processing apparatus to perform operations comprising:
   determining, using the internet protocol mesh module, whether a peer unmanned vehicle is within a predetermined physical distance from the unmanned vehicle to enable creation of a mesh network for network communications between the unmanned vehicle and the peer unmanned vehicle;
   determining, using the cellular gateway module, whether the unmanned vehicle can connect to a cellular network;
   determining, using the available networks, a communications path between the unmanned vehicle and a control system that is not a peer unmanned vehicle, that is a separate system from the unmanned vehicle, and which generates navigation commands for the unmanned vehicle;
   creating, using the communications path between the unmanned vehicle and the control system, a network connection with the control system to allow the unmanned vehicle to receive navigation commands from the control system;
   receiving, from the control system via the network connection, navigation commands; and
   using the navigation commands to control movement of the unmanned vehicle;
   determining, using the available networks, that a communications path between the unmanned vehicle and the control system is not available;
   determining, using the available networks, that a second communications path between the unmanned vehicle and a local control station is available;
   creating, using the second communications path, a second network connection with the local control station;
   receiving, from the local control station via the second network connection, second navigation commands; and
   using the second navigation commands to control movement of the unmanned vehicle.

2. The unmanned vehicle of claim 1, comprising one or more sensors, the operations comprising:
   capturing, from each of the one or more sensors, sensor data; and
   providing, to the control system via the network connection, the sensor data for analysis by another device.

3. The unmanned vehicle of claim 2, wherein providing the sensor data for analysis by another device comprises providing the sensor data for analysis by an operator device separate from the control system.

4. The unmanned vehicle of claim 2, wherein providing the sensor data for analysis by another device comprises providing the sensor data for analysis by the control system.

5. The unmanned vehicle of claim 1, wherein:
   creating the network connection with the control system comprises creating an encrypted network connection with the control system for use during all network communications with the control system; and
   receiving, from the control system via the network connection, the navigation commands comprises receiving, from the control system via the encrypted network connection, encrypted data that includes the navigation commands, the operations comprising decrypting the encrypted data to determine the navigation commands.

6. The unmanned vehicle of claim 1, the operations comprising:
   providing, to the control system that includes one or more computers using the network connection, current location data for the unmanned vehicle, wherein:
   receiving, from the control system via the network connection, navigation commands comprises receiving, from the control system via the network connection, navigation commands the control system generated using the current location data for the unmanned vehicle, data from an external source, and a mission path for the unmanned vehicle; and
   using the navigation commands to control movement of the unmanned vehicle comprises in response to receiving the navigation commands, changing a current path of the unmanned vehicle using the received navigation commands.

7. The unmanned vehicle of claim 6, wherein:
   the data from the external source comprises data that identifies one or more hazards, one or more obstacles, one or more airspace restrictions, or one or more notices to airmen; and
   changing the current path of the unmanned vehicle using the received navigation commands comprises changing the current path of the unmanned vehicle using the received navigation commands generated using the data that identifies the one or more hazards, the one or more obstacles, the one or more airspace restrictions, or the one or more notices to airmen.

8. The unmanned vehicle of claim 6, wherein:
   the data from the external source comprises data that identifies current positions and trajectories for one or more other vehicles; and
   changing the current path of the unmanned vehicle using the received navigation commands comprises changing the current path of the unmanned vehicle using the received navigation commands generated using the data that identifies the current positions and the trajectories for the one or more other vehicles.

9. The unmanned vehicle of claim 6, wherein:
the data from the external source comprises data that identifies traffic management data; and
changing the current path of the unmanned vehicle using the received navigation commands comprises changing the current path of the unmanned vehicle using the received navigation commands generated using the data that identifies the traffic management data.

10. The unmanned vehicle of claim 6, wherein:
the data from the external source comprises data that identifies current weather conditions; and
changing the current path of the unmanned vehicle using the received navigation commands comprises changing the current path of the unmanned vehicle using the received navigation commands generated using the data that identifies the current weather conditions.

11. The unmanned vehicle of claim 6, wherein:
the data from the external source comprises data that identifies predicted weather conditions; and
changing the current path of the unmanned vehicle using the received navigation commands comprises changing the current path of the unmanned vehicle using the received navigation commands generated using the data that identifies the predicted weather conditions.

12. The unmanned vehicle of claim 6, wherein:
the data from the external source comprises data that identifies a likelihood of risk to the unmanned vehicle; and
changing the current path of the unmanned vehicle using the received navigation commands comprises changing the current path of the unmanned vehicle using the received navigation commands generated using the data that identifies the likelihood of risk to the unmanned vehicle.

13. The unmanned vehicle of claim 12, wherein the data that identifies a likelihood of risk to the unmanned vehicle comprises data that identifies a likelihood of risk to the unmanned vehicle based on a proximity of the unmanned vehicle to another vehicle.

14. The unmanned vehicle of claim 12, wherein the data that identifies a likelihood of risk to the unmanned vehicle comprises data that identifies a likelihood of risk to the unmanned vehicle based on a condition of an operational area for the mission path of the unmanned vehicle.

15. A computer-implemented method comprising:
determining, by an unmanned vehicle using an internet protocol mesh hardware module, whether a peer unmanned vehicle is within a predetermined physical distance from the unmanned vehicle to enable creation of a mesh network for network communications between the unmanned vehicle and the peer unmanned vehicle, wherein the unmanned vehicle includes the internet protocol mesh hardware module and a cellular gateway hardware module;
determining, by the unmanned vehicle using the cellular gateway hardware module, whether the unmanned vehicle can connect to a cellular network;
determining, using the available networks, a communications path between the unmanned vehicle and a control system that is not a peer unmanned vehicle, and which is a separate system from the unmanned vehicle, and which generates navigation commands for the unmanned vehicle;
creating, using the communications path between the unmanned vehicle and the control system, a network connection with the control system to allow the unmanned vehicle to receive navigation commands from the control system, wherein creating the network connection with the control system comprises creating an encrypted network connection with the control system for use during all network communications with the control system;
receiving, from the control system via the network connection, navigation commands by receiving, from the control system via the encrypted network connection, encrypted data that includes the navigation commands;
decrypting the encrypted data to determine the navigation commands; and
using the navigation commands to control movement of the unmanned vehicle.

16. A non-transitory computer readable storage medium storing instructions executable by a data processing apparatus and upon such execution cause the data processing apparatus to perform operations comprising:
determining, by the data processing apparatus using an internet protocol mesh module, whether a peer unmanned vehicle is within a predetermined physical distance from an unmanned vehicle that includes the data processing apparatus to enable creation of a mesh network for network communications between the unmanned vehicle and the peer unmanned vehicle, wherein the unmanned vehicle includes the internet protocol mesh module and a cellular gateway module;
determining, by the data processing apparatus using the cellular gateway module, whether the unmanned vehicle can connect to a cellular network;
determining, by the data processing apparatus using the available networks, a communications path between the unmanned vehicle and a control system that includes one or more computers separate from the unmanned vehicle, that is not a peer unmanned vehicle, and which generates navigation commands for the unmanned vehicle;
creating, by the data processing apparatus using the communications path between the unmanned vehicle and the control system, a network connection with the control system to allow the unmanned vehicle to receive navigation commands from the control system;
providing, to the control system using the network connection, current location data for the unmanned vehicle;
receiving, by the data processing apparatus from the control system via the network connection, navigation commands the control system generated using the current location data for the unmanned vehicle, data from an external source, and a mission path for the unmanned vehicle; and
in response to receiving the navigation commands, changing, by the data processing apparatus, a current path of the unmanned vehicle using the received navigation commands.

17. The computer readable storage medium of claim 16, the operations comprising:
capturing, from each of one or more sensors, sensor data; and
providing, to the control system via the network connection, the sensor data for analysis by another device.

18. The computer readable storage medium of claim 17, wherein providing the sensor data for analysis by another device comprises providing the sensor data for analysis by an operator device separate from the control system.

19. The computer readable storage medium of claim 17, wherein providing the sensor data for analysis by another device comprises providing the sensor data for analysis by the control system.

20. The computer readable storage medium of claim 16, wherein:
creating the network connection with the control system comprises creating an encrypted network connection with the control system for use during all network communications with the control system; and
receiving, from the control system via the network connection, the navigation commands comprises receiving, from the control system via the encrypted network connection, encrypted data that includes the navigation commands, the operations comprising decrypting the encrypted data to determine the navigation commands.

21. The computer readable storage medium of claim 16, wherein:
the data from the external source comprises data that identifies one or more hazards, one or more obstacles, one or more airspace restrictions, or one or more notices to airmen; and
changing the current path of the unmanned vehicle using the received navigation commands comprises changing the current path of the unmanned vehicle using the received navigation commands generated using the data that identifies the one or more hazards, the one or more obstacles, the one or more airspace restrictions, or the one or more notices to airmen.

22. The computer readable storage medium of claim 16, wherein:
the data from the external source comprises data that identifies current positions and trajectories for one or more other vehicles; and
changing the current path of the unmanned vehicle using the received navigation commands comprises changing the current path of the unmanned vehicle using the received navigation commands generated using the data that identifies the current positions and the trajectories for the one or more other vehicles.

23. The computer readable storage medium of claim 16, wherein:
the data from the external source comprises data that identifies traffic management data; and
changing the current path of the unmanned vehicle using the received navigation commands comprises changing the current path of the unmanned vehicle using the received navigation commands generated using the data that identifies the traffic management data.

24. The computer readable storage medium of claim 16, wherein:
the data from the external source comprises data that identifies current weather conditions; and
changing the current path of the unmanned vehicle using the received navigation commands comprises changing the current path of the unmanned vehicle using the received navigation commands generated using the data that identifies the current weather conditions.

25. The computer readable storage medium of claim 16, wherein:
the data from the external source comprises data that identifies predicted weather conditions; and
changing the current path of the unmanned vehicle using the received navigation commands comprises changing the current path of the unmanned vehicle using the received navigation commands generated using the data that identifies the predicted weather conditions.

26. The computer readable storage medium of claim 16, wherein:
the data from the external source comprises data that identifies a likelihood of risk to the unmanned vehicle; and
changing the current path of the unmanned vehicle using the received navigation commands comprises changing the current path of the unmanned vehicle using the received navigation commands generated using the data that identifies the likelihood of risk to the unmanned vehicle.

27. The computer readable storage medium of claim 26, wherein the data that identifies a likelihood of risk to the unmanned vehicle comprises data that identifies a likelihood of risk to the unmanned vehicle based on a proximity of the unmanned vehicle to another vehicle.

28. The computer readable storage medium of claim 26, wherein the data that identifies a likelihood of risk to the unmanned vehicle comprises data that identifies a likelihood of risk to the unmanned vehicle based on a condition of an operational area for the mission path of the unmanned vehicle.

* * * * *